United States Patent
Lu et al.

(10) Patent No.: US 12,067,234 B2
(45) Date of Patent: Aug. 20, 2024

(54) DEVICE AND METHOD FOR IMPLEMENTING LIVE MIGRATION

(71) Applicant: Cambricon (Xi'an) Semiconductor Co., Ltd., Xi'an (CN)

(72) Inventors: Haibo Lu, Xi'an (CN); Xiaofu Meng, Xi'an (CN)

(73) Assignee: CAMBRICON (XI'AN) SEMICONDUCTOR CO., LTD., Xi'an (CN)

( * ) Notice: Subject to any disclaimer, the term of this patent is extended or adjusted under 35 U.S.C. 154(b) by 34 days.

(21) Appl. No.: 18/003,689

(22) PCT Filed: Jun. 24, 2021

(86) PCT No.: PCT/CN2021/102073
§ 371 (c)(1),
(2) Date: Dec. 28, 2022

(87) PCT Pub. No.: WO2022/062510
PCT Pub. Date: Mar. 31, 2022

(65) Prior Publication Data
US 2023/0244380 A1    Aug. 3, 2023

(30) Foreign Application Priority Data

Sep. 28, 2020   (CN) .......... 202011043849.9
Sep. 28, 2020   (CN) .......... 202011043863.9
(Continued)

(51) Int. Cl.
*G06F 3/06*   (2006.01)
*G06F 9/455*  (2018.01)

(52) U.S. Cl.
CPC .......... *G06F 3/0604* (2013.01); *G06F 3/0647* (2013.01); *G06F 3/0679* (2013.01); *G06F 9/45558* (2013.01); *G06F 2009/45579* (2013.01)

(58) Field of Classification Search
CPC .... G06F 3/0604; G06F 3/0647; G06F 3/0679; G06F 9/45558; G06F 2009/45579
See application file for complete search history.

(56) References Cited

U.S. PATENT DOCUMENTS

2012/0159481 A1*  6/2012  Anderson ........... G06F 9/45558
                                                            718/1
2012/0254862 A1  10/2012  Dong
(Continued)

FOREIGN PATENT DOCUMENTS

| CN | 104135496 A | 11/2014 |
|---|---|---|
| CN | 110275789 A | 9/2019 |
| CN | 111506385 A | 8/2020 |

OTHER PUBLICATIONS

PCT/CN2021/102073—International Search Report, mailed on Sep. 29, 2021, 6 pages.

*Primary Examiner* — William E. Baughman
(74) *Attorney, Agent, or Firm* — Getech Law LLC; Jun Ye

(57) ABSTRACT

The present disclosure relates to a device and a method for implementing live migration, where an on-chip system of the present disclosure is comprised in an integrated circuit apparatus, which comprises a general interconnection interface and other processing apparatuses. The computation apparatus interacts with other processing apparatuses to jointly complete computing operations specified by users. The integrated circuit apparatus also comprises a storage apparatus. The storage apparatus is respectively connected to the computation apparatus and other processing appara- (Continued)

tuses and is used for storing data of the computation apparatus and other processing apparatuses.

20 Claims, 29 Drawing Sheets

(30) Foreign Application Priority Data

Sep. 28, 2020 (CN) .......................... 202011043865.8
Sep. 28, 2020 (CN) .......................... 202011045832.7
Sep. 28, 2020 (CN) .......................... 202011045841.6

(56) References Cited

U.S. PATENT DOCUMENTS

| 2013/0227551 | A1* | 8/2013 | Tsirkin | G06F 9/45558 |
| | | | | 718/1 |
| 2015/0355924 | A1* | 12/2015 | Holla | G06F 9/45558 |
| | | | | 718/1 |
| 2016/0203027 | A1* | 7/2016 | Challa | G06F 9/45558 |
| | | | | 718/1 |
| 2020/0249987 | A1* | 8/2020 | Jiang | G06F 9/5077 |
| 2020/0272458 | A1 | 8/2020 | Guan et al. | |
| 2020/0294183 | A1* | 9/2020 | Tian | G06T 1/20 |
| 2022/0121473 | A1* | 4/2022 | Gong | G06F 9/45558 |

* cited by examiner

| 525 | 526 | 527 | 528 | 527 | 528 |
|---|---|---|---|---|---|
| .foo_nested | foo_nested_t | .foo_nested.a | 20 | .foo_nested.b | 10 |

Fig. 6

| 20 | 8 | 4 | NIL | NIL | 12 | 10 | NIL | NIL | 14 | NIL | NIL | 22 | NIL | NIL |
|----|---|---|-----|-----|----|----|-----|-----|----|-----|-----|----|-----|-----|

537

Fig. 8

DEVICE AND METHOD FOR IMPLEMENTING LIVE MIGRATION

CROSS REFERENCE OF RELATED APPLICATIONS

The present application is a 371 of international Application PCT/CN2021/102073, filed Jun. 24, 2021, which claims priority to Chinese Patent Application No. 202011045832.7 with the title of "Method, Apparatus and Storage Medium for Implementing Live Migration" filed on Sep. 28, 2020; No. 202011045841.6 with the title of "Apparatus, Related Methods and Readable Storage Medium for Implementing Live Migration" filed on Sep. 28, 2020; No. 202011043863.9 with the title of "Apparatus, Method, and Storage Medium for Realizing Serialization and Deserialization Tree Data" filed on Sep. 28, 2020; No. 202011043849.9 with the title of "Apparatus, Method, and Storage Medium for Realizing Serialization and Deserialization Nested Data" filed on Sep. 28, 2020; and No. 202011043865.8 with the title of "Apparatus, Method, and Storage Medium for Realizing Serialization and Deserialization Logical Pointer" filed on Sep. 28, 2020. The contents of the aforementioned applications are incorporated herein by reference in their entireties.

TECHNICAL FIELD

The present disclosure generally relates to a computer field. More specifically, the present disclosure relates to a device and a method for implementing live migration.

BACKGROUND

Live migration is also called dynamic migration, which means that a virtual machine saves an operation state of the entire virtual machine through a SAVE/LOAD program, and migrates the state from one physical server to another physical server. After recovery, the virtual machine may be operated smoothly, and users may not perceive any difference.

In an artificial intelligence field, because of high complexity of an application specific integrated circuit (ASIC), the live migration may not be fully implemented. Especially in a process of live migration, how a source server serializes information and how a destination server deserializes the information are problems that are required to be solved in the prior art.

SUMMARY

To at least partly solve the technical problem mentioned in the background, solutions of the present disclosure provide a device and a method for implementing live migration.

A first aspect of the present disclosure provides a system for implementing live migration save. The system is connected to kernel space, and the system includes a read only memory (ROM) and a serializer. The ROM stores firmware, which includes a physical function that is virtualized to a plurality of virtual functions, and the physical function receives a live migration start request from the kernel space, where the live migration start request specifies live migration of a specific virtual function, where the specific virtual function is one of the plurality of virtual functions. The serializer is configured to respond to the live migration start request to generate a data structure of to-be-migrated information. The data structure includes a protocol layer, which includes a domain identifier configured to record the specific virtual function. The physical function sends the to-be-migrated information to the kernel space.

A second aspect of the present disclosure provides a system for implementing live migration recovery. The system is connected to kernel space, and the system includes a read only memory (ROM) and a deserializer. The ROM stores firmware that includes a physical function, which is virtualized to a plurality of virtual functions. The physical function receives to-be migrated information, whose data structure includes a protocol layer that includes a domain identifier. The deserializer is configured to take out information of a specific virtual function from the domain identifier, where the specific virtual function is one of the plurality of virtual functions, and recover the to-be-migrated information to the specific virtual function.

A third aspect of the present disclosure provides a method for saving path when implementing the live migration to the system. The system is connected to kernel space and includes an ROM that stores firmware. The firmware includes a physical function that is virtualized to a plurality of virtual functions. The method includes: receiving a live migration start request that specifies live migration of a specific virtual function, where the specific virtual function is one of the plurality of virtual functions; generating a data structure of to-be-migrated information, where the data structure includes a domain identifier configured to record the specific virtual function; and sending the to-be-migrated information to the kernel space.

A fourth aspect of the present disclosure provides a method for recovering path when implementing the live migration to the system. The system is connected to kernel space and only includes an ROM that stores firmware, which includes a physical function that is virtualized to a plurality of virtual functions. The method includes: receiving to-be-migrated information, whose data structure includes a domain identifier; taking out information of a specific virtual function from the domain identifier, where the specific virtual function is one of the plurality of virtual functions; and recovering the to-be-migrated information to the specific virtual function.

A fifth aspect of the present disclosure provides a system for implementing live migration save, where the system includes a serializer configured to: respond to a live migration start request to generate a data structure of to-be-migrated information, where the to-be-migrated information includes a struct; generate a signal identifier in the data structure to indicate the struct; and place a prefix signal and a name of the struct in the signal identifier.

A sixth aspect of the present disclosure provides a system for implementing live migration recovery, where the system includes an ROM and a deserializer. The ROM stores firmware that includes a physical function, which is virtualized to a plurality of virtual functions. The physical function receives to-be migrated information, which includes a struct. A data structure of the to-be-migrated information includes a signal identifier configured to indicate the struct, where the signal identifier includes a prefix signal and a name of the struct. The deserializer is configured to identify the name of the struct according to the prefix signal.

A seventh aspect of the present disclosure provides a method for generating a data structure of to-be-migrated information, and the method includes: receiving a live migration start request; and in response to the live migration start request, generating the data structure, where the to-be-migrated information includes a struct, and steps of generating the data structure includes: generating a signal identifier configured to indicate the struct, where the signal identifier includes a prefix signal and a name of the struct; and sending the to-be-migrated information.

An eighth aspect of the present disclosure provides a method for judging to-be-migrated information, including: receiving the to-be-migrated information that includes a struct, where a data structure of the to-be-migrated information includes a signal identifier configured to indicate the struct, where the signal identifier includes a prefix signal and a name of the struct; identifying the prefix signal; and identifying the name of the struct according to the prefix signal.

A ninth aspect of the present disclosure provides a system for serializing tree data, including: a memory and a serializer, where the memory is configured to store the tree data, and the serializer is configured to: in response to a live migration start request, generate to-be-migrated information, whose data structure includes a value identifier; traverse the tree data according to a specific order to form serialized data; and place the serialized data in the value identifier.

A tenth aspect of the present disclosure provides a system for deserializing tree data, including a deserializer and a memory. The deserializer is configured to: receive to-be-migrated information, whose data structure includes a value identifier; take out serialized data from the value identifier; and restore the serialized data to the tree data according to a specific order. The memory is configured to store the tree data.

An eleventh aspect of the present disclosure provides a method for serializing tree data, including: in response to a live migration start request, generating to-be-migrated information, whose data structure includes a value identifier; traversing the tree data according to a specific order to form serialized data; and placing the serialized data in the value identifier.

A twelfth aspect of the present disclosure provides a method for deserializing tree data, including: receiving to-be-migrated information, whose data structure includes a value identifier; taking out serialized data from the value identifier; restoring the serialized data to the tree data according to a specific order memory; and storing the tree data to a memory.

A thirteenth aspect of the present disclosure provides a system for serializing nested data, where the nested data at least includes a first layer struct and a second layer struct, and the system includes a memory and a serializer. The memory is configured to store the nested data. The serializer is configured to respond to a live migration start request to generate to-be-generated information, whose data structure includes: a data structure layer includes a first signal identifier configured to record a name of the first layer struct; and a serialization layer, which includes a second signal identifier configured to record a name of the second struct.

A fourteenth aspect of the present disclosure provides a system for deserializing nested data, where the nested data at least includes a first layer struct and a second layer struct, and the system includes a memory and a deserializer. The deserializer is configured to: receive to-be migrated information, whose data structure includes: a data structure layer that includes a first signal identifier, and a serialization layer that includes a second signal identifier; take out first serialized data according to the first signal identifier; take out second serialized data according to the second signal identifier; restore the first serialized data to the first layer struct; and restore the second serialized data to the second layer struct. The memory is configured to store the first layer struct and the second layer struct.

A fifteenth aspect of the present disclosure provides a method for serializing nested data, where the nested data at least includes a first layer struct and a second layer struct, and the method includes: generating to-be-migrated information in response to a live migration start request, where steps of generating the to-be-migrated information are as follows: generating a first signal identifier in a data structure layer of the to-be-migrated information to record a name of the first layer struct; and generating a second signal identifier in a serialization layer of the to-be-migrated information to record a name of the second layer struct.

A sixteenth aspect of the present disclosure provides a method for deserializing nested data, where the nested data at least includes a first layer struct and a second layer struct, and the method includes: receiving to-be-migrated information, whose data structure includes a data structure layer that includes a first signal identifier and a serialization layer that includes a second signal identifier; taking out first serialized data according to the first signal identifier; taking out second serialized data according to the second signal identifier; restoring the first serialized data to the first layer struct; restoring the second serialized data to the second layer struct; and storing the first layer struct and the second layer struct.

A seventeenth aspect of the present disclosure provides a system for serializing a logical pointer, including: a memory and a serializer. The memory is configured to stores a first struct and a second struct. The serializer is configured to: in response to a live migration start request, generate to-be-migrated information; generate a first signal identifier and a first entity identifier in the data structure of the to-be-generated information; place a name of the first struct in the first signal identifier; and place a name of the logical pointer in the first entity identifier, where the name of the logical pointer is the name of the second struct.

An eighteenth aspect of the present disclosure provides a system for deserializing a logical pointer that includes a deserializer, which is configured to receive to-be-migrated information, whose data structure includes a first signal identifier and a first entity identifier; take out a name of a first struct from the first signal identifier; and take out a name of a second struct from the first entity identifier.

A nineteenth aspect of the present disclosure provides a method for serializing a logical pointer, where the logical pointer establishes a relevance between a first struct and a second struct, and the method includes: in response to a live migration start request, generating to-be-migrated information; generating a first signal identifier and a first entity identifier in a data structure of the to-be-generated information; placing a name of the first struct in the first signal identifier; and placing a name of the second struct in the first entity identifier.

A twentieth aspect of the present disclosure provides a method for deserializing a logical pointer, and the method comprises: receiving to-be-migrated information, whose data structure includes a first signal identifier and a first entity identifier; taking out a name of a firt struct from the first signal identifier; and taking out a name of a second struct from the first entity identifier.

The present disclosure may realize serialization of information in a source server, and realize deserialization of information in a destination server, thereby achieving a technical effect of live migration.

BRIEF DESCRIPTION OF DRAWINGS

By reading the following detailed description with reference to the drawings, other objects, features and technical effects of the exemplary embodiments of the present disclosure may become easier to understand. In the accompanying drawings, several embodiments of the present disclosure are shown in an exemplary but not a restrictive manner, and the same or corresponding reference numerals indicate the same or corresponding parts of the embodiments.

FIG. 6 is a schematic diagram of a struct in a data structure layer according to an embodiment of the present disclosure.

FIG. 8 is serialized data obtained by traversing the tree data according to an embodiment of the present disclosure.

DETAILED DESCRIPTION

Technical solutions in embodiments of the present disclosure may be described clearly and completely hereinafter with reference to the accompanied drawings in the embodiments of the present disclosure. Described embodiments are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" in claims, specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiment rather than limiting the present disclosure. As being used in the specification and the claims of the disclosure, unless the context clearly indicates otherwise, the singular forms "a", "an" and "the" are intended to include the plural forms. It should also be understood that the term "and/or" used in the specification and the claims refers to any or all possible combinations of one or more of relevant listed items and includes these combinations.

As being used in this specification and the claim, the term "if" may be interpreted as "when", or "once" or "in response to a determination" or "in response to a case where something is detected" depending on the context.

Combined with drawings, the following may describe specific embodiments of the present disclosure in detail.

The present disclosure relates to a framework that adopts a virtualization technology, and the framework is applied to an application-specific integrated circuit. For example, the framework may be applied to a machine learning device of a neural network, and the machine learning device may be a convolutional neural network accelerator. The following takes an artificial intelligence chip as an example.

Figure 1:
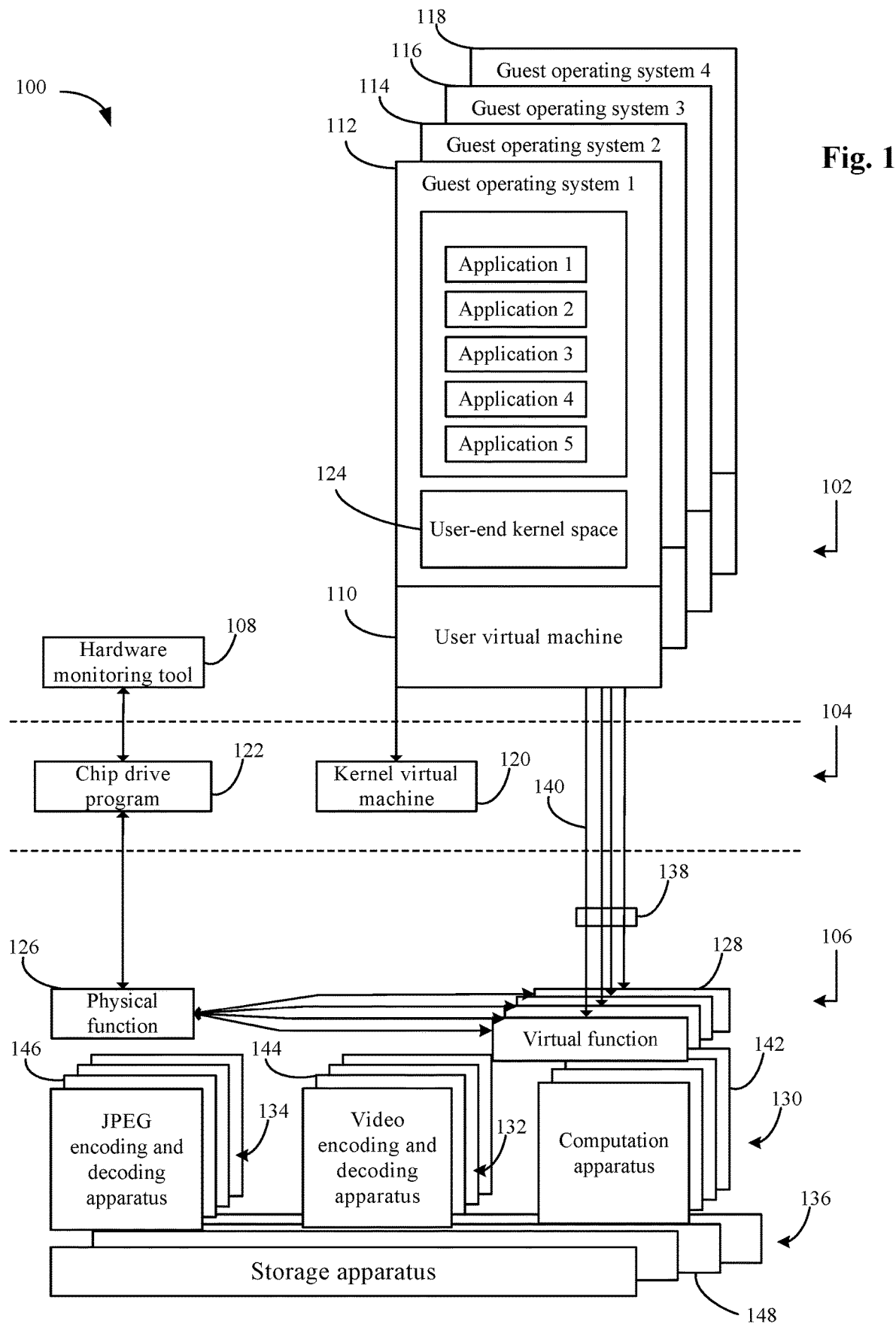
FIG. 1 is a schematic diagram of an artificial intelligence chip framework according to an embodiment of the present disclosure.

FIG. 1 is a frame diagram of artificial intelligence chip virtualization. A frame 100 includes user space 102, kernel space 104 and an on-chip system 106, which are separated by dotted lines in FIG. 1. The user space 102 is operation space of a user program, and may only perform simple computations. The user space 102 may not directly call system resources, but may only send instructions to the kernel space 104 through a system interface. The kernel space 104 is operation space of a kernel code, and the kernel space 104 may perform any instructions and may call any resources of the system. The on-chip system 106 is a unit of the artificial intelligence chip, and may collaborate with the user space 102 through the kernel space 104.

In this embodiment, in order to distinguish hardware of the user space 102 and hardware of the on-chip system 106, hardware of the user space 102 may be called as a device, and hardware of the on-chip system 106 may be called as an apparatus or a unit. Such arrangement is only to describe technologies of the embodiment more clearly, instead of making any limitation on technologies of the present disclosure.

Unless particular emphasized, this embodiment is illustrated by the example of virtualizing one real component into four virtual components, and the present disclosure does not limit the number of the virtual components.

Before operating virtualization, the user space 102 is controlled by a hardware monitoring tool 108, and obtains information of the on-chip system 106 through a call interface. The hardware monitoring tool 108 may not only collect information of the on-chip system 106, but may obtain resource overheads on the on-chip system 106 by upper software in real time, thereby providing real-time detailed information and state of the current on-chip system 106 to the users. The detailed information and state may be dozens of types of data, such as a hardware device model, a firmware version number, a driver version number, device utilization, storage apparatus overhead state, board card power consumption, board card peak power consumption and a peripheral component interconnect express (PCIe). Because of different versions and usage scenarios of the hardware monitoring tool 108, content and number of the monitored information may be different.

After the system starts virtualization, operations of the user space 102 are taken over by a user virtual machine 110. The user virtual machine 110 is abstraction and simulation of the real computing environment. The system may allocate a set of data structures to manage a state of the user virtual machine 110. The set of data structures includes a complete set of register, service condition of a physical memory, and state of a virtual device, and the like. The physical space of the user space 102 of the embodiment is virtualized to four virtual spaces 112, 114, 116 and 118. The four virtual spaces are independent and may not influence each other, and may respectively carry different guest operating systems, such as a guest operating system 1, a guest operating system 2, a guest operating system 3 and a guest operating system 4 shown in the figure. The guest operating system may be Windows, Linus, Unix, iOS, and Android, and different applications may be operated on different operating systems.

In an embodiment of the present disclosure, the user virtual machine 110 is implemented through a quick emulator (QEMU). The QEMU is an open source virtualization software programmed by C language, and may virtualize the interface through dynamic binary conversion, and provide a series of hardware models to make the guest operating system 1, the guest operating system 2, the guest operating system 3 and the guest operating system 4 think they directly visit the on-chip system 106. The user space 102 includes a processor, a memory, an I/O device and the like. The QEMU may virtualize the processor of the user space 102 to four virtual processors, and virtualize the memory to four virtual memories, and may also virtualize the I/O device to four virtual I/O devices. Each guest operating system takes a part resources of the user space 102. For example, taking a quarter resources of the user space means each operating system may respectively access a virtual processor, a virtual memory, and a virtual I/O device to perform a task of the guest operating system. Through this mode, the guest operating system 1, the guest operating system 2, the guest operating system 3 and the guest operating system 4 may be operated independently.

The kernel space 104 carries a kernel virtual machine 120 and a chip drive program 122. The kernel virtual machine 120 is matched with the QEMU, and the main responsibility is to virtualize the kernel space 104 and the on-chip system 106 to make each guest operating system has its own address space when accessing the on-chip system 106. Specifically, a space on the on-chip system 106 mapped to the guest operating system is actually a virtual component mapped to this process.

The kernel virtual machine 120 includes a physical function drive program configured to manage global functions of an SR-IOV (Single Root I/O Virtualization) device specifically, and to make operation on the global functions of the SR-IOV device, the physical function drive program may have higher authority than a normal virtual machine. The physical function drive program includes functions of all traditional drive programs, so that the user space 102 may access I/O resources of the on-chip system 106.

From the perspective of the user virtual machine 110, during the operation of the virtual machine, the QEMU calls the interface for kernel setup through the system provided by the kernel virtual machine 120. The QEMU uses the virtualization function of the kernel virtual machine 120 to provide hardware virtualization acceleration for the virtual machine of the QEMU to improve performance of the virtual machine. From the perspective of the kernel virtual machine 120, when the user may not directly interact with the kernel space 104, a manage tool of the user space 102 may be required, so that the QEMU, a tool operated in the user space 102, may be required.

A chip drive program 122 is configured to drive a physical function (PF) 126. During operation of the virtual machine, the user space 102 does not use the hardware monitor tool 108, but uses the chip drive program 122 to access the on-chip system 106. Therefore, the guest operating system 1, the guest operating system 2, the guest operating system 3 and the guest operating system 4 are respectively configured with a user-end kernel space 124 to load the chip drive program 122, which enables each guest operating system drive the on-chip system 106.

The on-chip system 106 performs virtualization through the SR-IOV technology. In particular, in the environment of the present disclosure, the SR-IOV technology may be implemented through combination of software and hardware, and may virtualize each component of the on-chip system 106. The SR-IOV technology is a virtualization solution that permits PCIe resources to be effectively shared among virtual machines. The SR-IOV technology makes single PCIe resources be shared by a plurality of virtual components of the on-chip system 106, providing specific resources for these virtual components. Therefore, each virtual component has its corresponding unique accessible resources.

The on-chip system 106 of the embodiment includes hardware and firmware. The hardware includes an ROM that is not shown in the figure, and the ROM is configured to store the firmware. The firmware includes a physical function 126 that is configured to support or cooperate with the PCIe function of the SR-IOV, and the physical function 126 has the power to fully configure the PCIe resources. When implementing the SR-IOV technology, the physical function 126 may virtualize a plurality of virtual functions (VFs) 128, and there are four virtual functions 128 in this embodiment. The virtual function 128 is a lightweight PCIe function managed by the physical function 126, and the virtual function 128 may share the PCIe physical resources with the physical function 126 and other virtual functions 128 related to the same physical function 126. The virtual function 128 is only allowed to control the resources configured by the physical function 126 to the virtual function 128.

Once the SR-IOV is enabled in the physical function 126, each virtual function 128 may access its own PCIe configuration space through its bus, device and function number. Each virtual function 128 has one memory space configured to map a register set of the virtual function 128. The virtual function 128 drives the program to operate on the register set to enable the function of the register set, and the function may be directly designated to the corresponding user virtual machine 110. Although the virtual function 128 is virtual, the user virtual machine 110 may consider the virtual 128 as a real PCIe device.

Hardware of the on-chip system 106 also includes a computation apparatus 130, a video encoding and decoding apparatus 132, a JPEG (joint photographic experts group) encoding and decoding apparatus 134, a storage apparatus 136 and a PCIe 138. In this embodiment, the computation apparatus 130 is an intelligence processing unit (IPU) configured to execute a convolution computation of the neural network; the video encoding and decoding apparatus 132 is configured to encode and decode video data; the JPEG encoding and decoding apparatus 134 is configured to encode and decode static pictures that adopt a JPEG algorithm; the storage apparatus 136 may be a dynamic random access memory (DRAM) configured to store data; and a PCIe 138 is the above-mentioned PCIe. During the operation of the virtual machine, the PCIe 138 may be virtualized to four virtual interfaces 140. The virtual functions 128 may have a one to one correspondence with the virtual interfaces 140; in other words, a first virtual function corresponds to a first virtual interface, and a second virtual function corresponds to a second virtual interface, and the like.

Through the SR-IOV technology, the computation apparatus 130 is virtualized to four virtual computation apparatuses 142, the video encoding and decoding apparatus 132 is virtualized to four virtual video encoding and decoding apparatuses 144, the JPEG encoding and decoding apparatus 134 is virtualized to four virtual JPEG encoding and decoding apparatuses 146, and the storage apparatus 136 is virtualized to four virtual storage apparatuses 148.

Each guest operating system is configured with a set of virtual suite, and each set of the virtual suite includes the user virtual machine 110, a virtual interface 140, a virtual function 128, a virtual computation apparatus 142, a virtual video encoding and decoding apparatus 144, a virtual JPEG encoding and decoding apparatus 146, and a virtual storage apparatus 148. Each set of the virtual suite may be operated independently without affecting each other, and the virtual suite is configured to perform the delivered tasks from the corresponding guest operating system, so as to make sure that each guest operating system may access the configured virtual computation apparatus 142, the virtual video encoding and decoding apparatus 144, the virtual JPEG encoding and decoding apparatus 146 and the virtual storage apparatus 148 through the configured virtual interface 140 and the virtual function 128.

Specifically, when performing the tasks, each guest operating system may need to access different hardware in response to different tasks. For example, if one task is to perform a matrix convolutional computation, the guest operating system may access the configured virtual computation apparatus 142 through the configured virtual interface 140 and the virtual function 128; if one task is to perform video encoding and decoding, the guest operating system may access the configured virtual video encoding and decoding apparatus 144 through the configured virtual interface 140 and the virtual function 128; if one task is to perform JPEG encoding and decoding, the guest operating system may access the configured virtual JPEG encoding and decoding apparatus 146 through the configured virtual interface 140 and the virtual function 128; and if one task is to read or write data, the guest operating system may access the configured virtual storage apparatus 148 through the configured virtual interface 140 and the virtual function 128.

Figure 2:
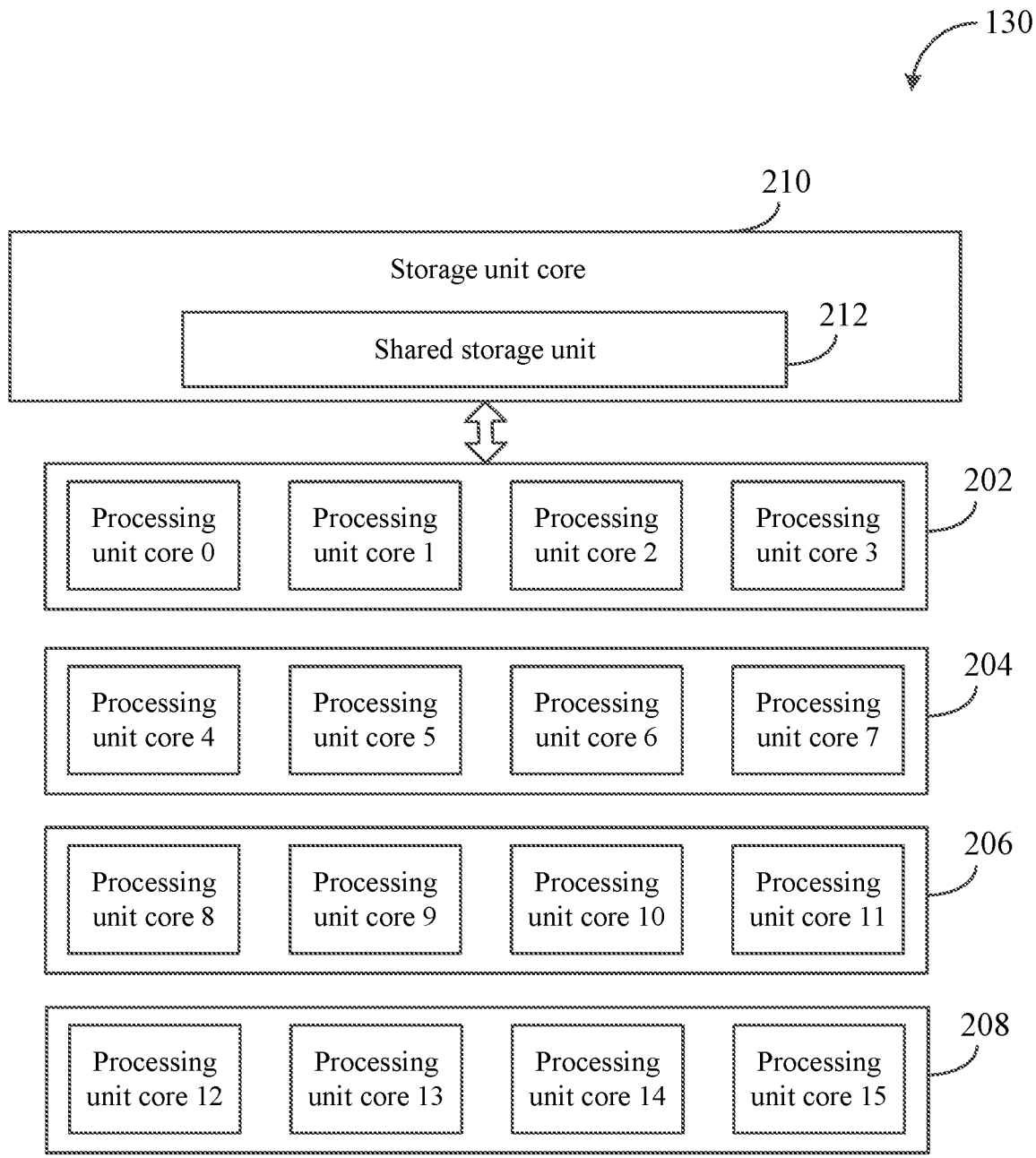
FIG. 2 is a schematic diagram of an inner structure of a computation apparatus according to an embodiment of the present disclosure.

FIG. 2 is a schematic diagram of an inner structure of a multi-core computation apparatus 130. The computation apparatus 130 has 16 processing unit cores (a processing unit core 0 to a processing unit core 15) configured to perform a matrix computation task, and every four processing unit cores constitute one processing unit group, which is a cluster. Specifically, the processing unit core 0 to a processing unit core 3 constitute a first cluster 202, a processing unit core 4 to a processing unit core 7 constitute a second cluster 204, a processing unit core 8 to a processing unit core 11 constitute a third cluster 206, and a processing unit core 12 to the processing unit core 15 constitute a fourth cluster 208. The computation apparatus 130 basically performs computation tasks in a unit of a cluster.

The computation apparatus 130 also includes a storage unit core 210 and a shared storage unit 212. The storage unit core 210 is mainly configured to control data exchange, and the storage unit core 210 is also the communication channel of the computation apparatus 130 and the storage apparatus 136. The shared storage unit 212 is configured to store computation intermediate values of these clusters 202, 204, 206 and 208 temporarily. During the virtualization operation, the storage unit core 210 may be divided to four virtual storage unit cores, and the shared storage unit 212 may also be divided into four virtual shared storage units.

Each virtual computation apparatus 142 is respectively configured with a virtual storage unit core, a virtual shared storage unit and a cluster to support tasks of a specific guest operating system. Similarly, each virtual computation apparatus 142 may be operated independently without interfering each other.

The number of clusters of the computation apparatus 130 may be at least equal to the number of virtual computation apparatus 142 to make sure that each virtual computation apparatus 142 may be configured with one cluster. When the number of clusters is higher than the number of the virtual computation apparatus 142, the cluster may be properly configured to the virtual computation apparatus 142 according to real demands to increase elasticity of hardware configuration.

The video encoding and decoding apparatus 132 of the embodiment includes six video encoding and decoding units. The video encoding and decoding apparatus 132 may elastically make adjustment and deployment with video encoding and decoding unit as a unit according to the number of virtual component and required resources. For example, the video encoding and decoding apparatus 132 is virtualized to four virtual video encoding and decoding apparatuses 144. Assuming a first virtual video encoding and decoding apparatus and a second virtual video encoding and decoding apparatus need more video encoding and decoding resources, two video encoding and decoding units may be respectively configured to the first virtual video encoding and decoding apparatus and the second virtual video encoding and decoding apparatus, and other virtual video encoding and decoding apparatuses 144 may be respectively configured with one video encoding and decoding unit. For another example, the video encoding and decoding apparatus 132 is virtualized to three virtual video encoding and decoding apparatuses 144. When no virtual video encoding and decoding apparatus needs more video encoding and decoding resources, two video encoding and decoding units may be respectively configured to each virtual video encoding and decoding apparatus 144.

The number of video encoding and decoding unit may at least be equal to the number of the virtual video encoding and decoding apparatus 144 to make sure that each virtual video encoding and decoding apparatus 144 may be configured with one video encoding and decoding unit. When the number of video encoding and decoding unit is higher than the number of the virtual video encoding and decoding apparatus 144, the video encoding and decoding unit may be properly configured to the virtual video encoding and decoding apparatus 144 according to real demands to increase elasticity of hardware configuration.

Similarly, the JPEG encoding and decoding apparatus 134 of the embodiment includes six JPEG encoding and decoding units. The JPEG encoding and decoding apparatus 134 may elastically make adjustment and deployment with the JPEG encoding and decoding unit as a unit according to the number of virtual component and required resources. The method of adjustment and deployment is the same to that of the video encoding and decoding apparatus 132 and will not be repeated here.

The storage apparatus 136 may adopt a non-uniform memory access (NUMA) architecture, including a plurality of DDR (double data rate) channels. The storage apparatus 136 may elastically make adjustment and deployment with the DDR channel as a unit according to the number of virtual components and required resources. The method of adjustment and deployment is the same to that of the computation apparatus 130, the video encoding and decoding apparatus 132, and the JPEG encoding and decoding apparatus 134, which may not be repeated here.

An application scenario of the present disclosure is a data center of a cloud. Maintenance needs to be done to the data center to ensure stability and fluency of the whole system. The maintenance involves computer sharing, database backup, troubleshooting, uneven distribution of resources (such as overload or underload) and daily maintenance. During the above mentioned maintenance, the data center needs to ensure normal operation of the system so that users may not notice any difference. A live migration technology is implemented based on the architecture of FIG. 1 and FIG. 2. The live migration technology may completely save the operation state of the whole virtual machine, and quickly recover the operation state to an original hardware platform or even different hardware platforms. After recovery, the virtual machine may be operated smoothly.

Based on the above-mentioned exemplary framework, the live migration solution of the present disclosure is divided into two stages: in a first stage, configuration and data on a source server are packed and sent to a destination server, which is a migration save path; and in a second stage, the configuration and data are put to corresponding place in the destination server, which is a migration recovery path. The live migration solution is to completely save the operation state and data of the whole virtual machine, and restore the operation state and the data to the original hardware platform or even different hardware platforms. No matter if in the same platform, the source server and the destination server have the architecture shown in FIG. 1 and FIG. 2. Besides, versions of hardware, software and firmware of the destination server are required to be equal to or higher than versions of hardware, software and firmware of the source server to make sure the destination server may identify information correctly during the migration recovery. The above-mentioned two stages of the live migration may be described respectively.

Figure 3:
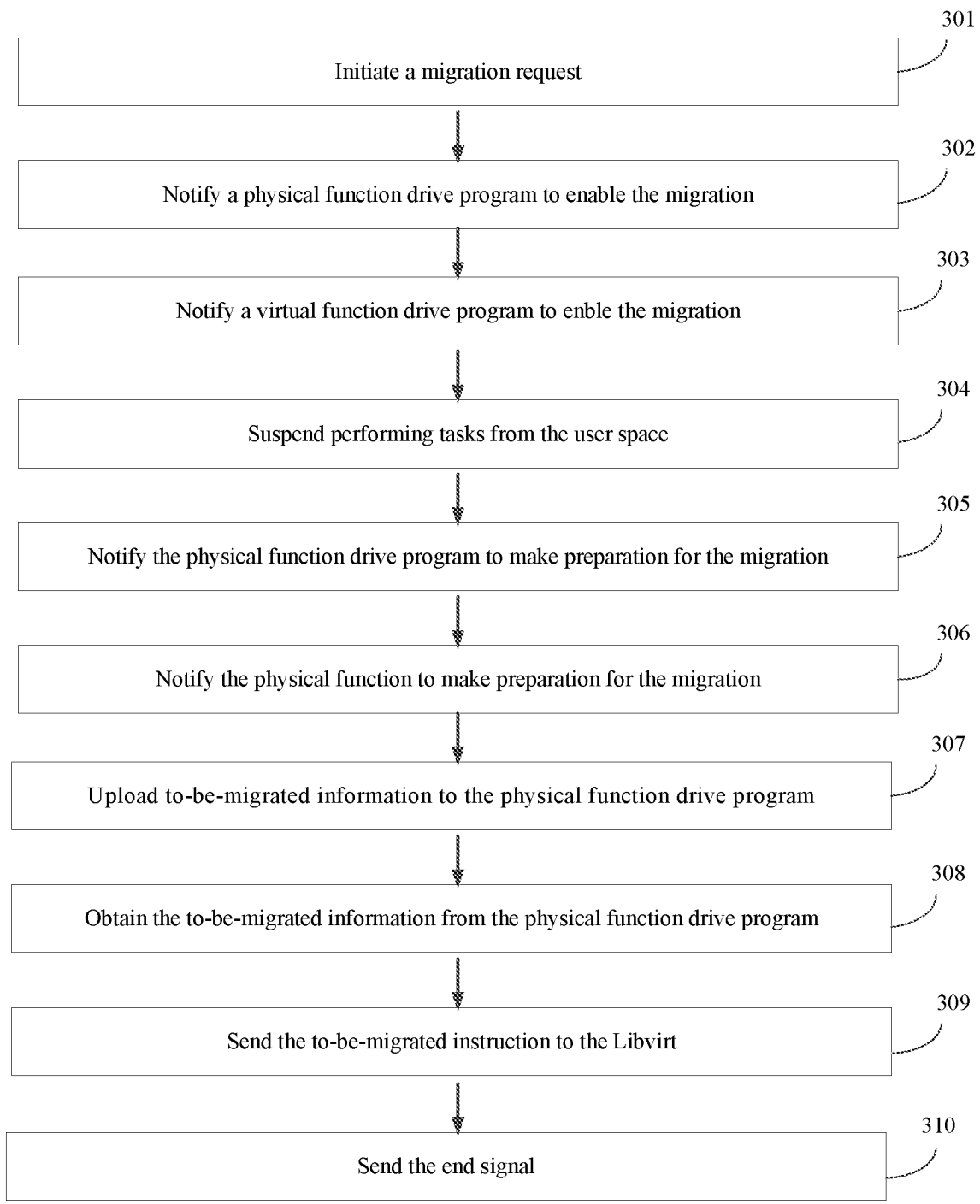
FIG. 3 is a flowchart of a migration save path according to an embodiment of the present disclosure.
Figure 4:
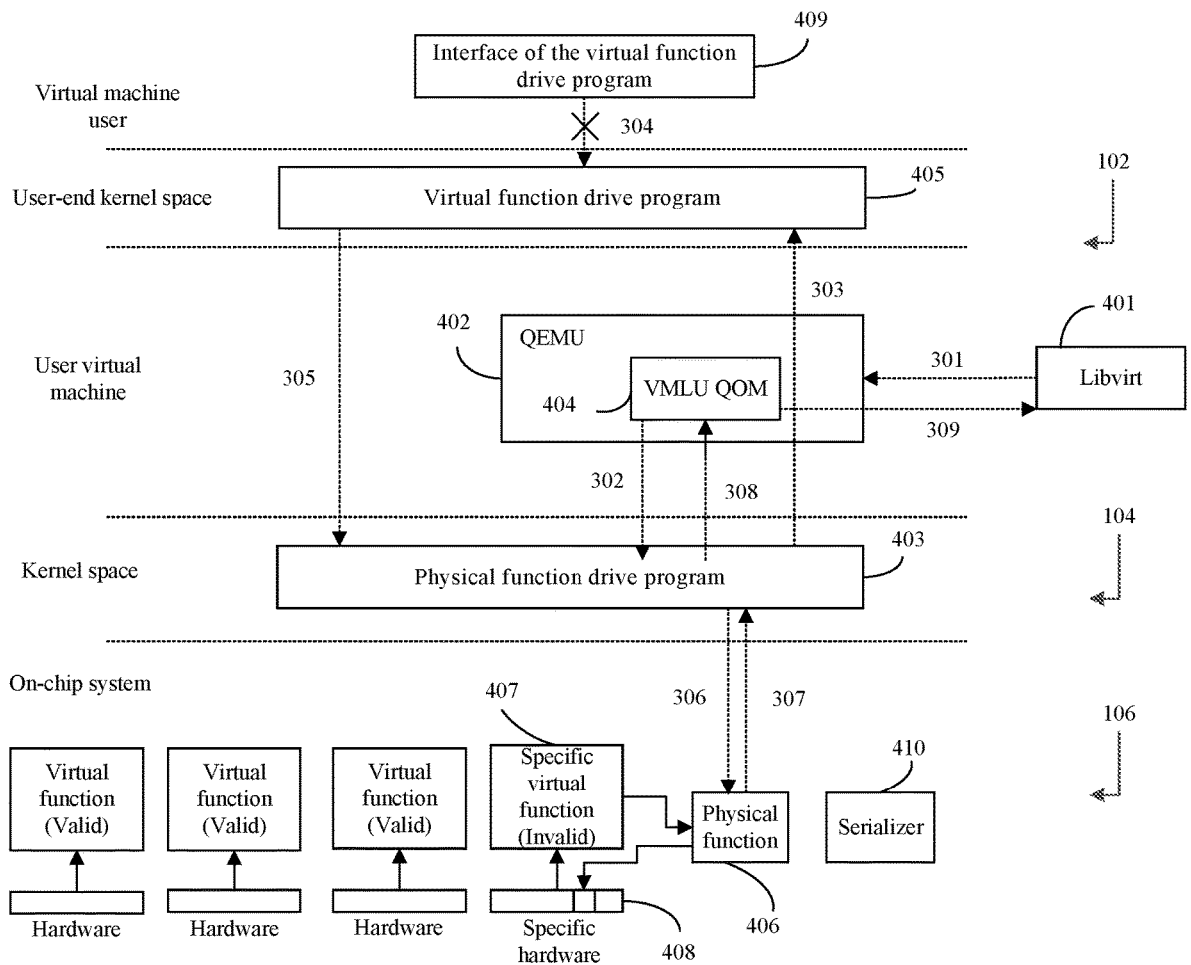
FIG. 4 is a schematic diagram of a migration save path on a source server side according to an embodiment of the present disclosure.

FIG. 3 is another embodiment of the present disclosure, and is a flowchart of a migration save path. A source server of the embodiment may be the system shown in FIG. 1. FIG. 4 is a schematic diagram of the migration save path implemented by the source server with the architecture of FIG. 1. In this embodiment, when the user space 102 is operated, the drive program, firmware and information of hardware, context information and state information of specific virtual hardware of the on-chip system 106 is packed and sent from the source server. The state information may include state information of the drive program, the firmware and the hardware, context state information of a state machine, a register, and internal state of the hardware, and context state information of a state machine of software, a variable and a constant when they are operated.

In a step 301, virtualization management software initiates a migration request to a QEMU 402. The virtualization management software of this embodiment is Libvirt 401, which is a background program, a management tool and an open source application programming interface (API) configured to manage the virtualized platform. Libvirt 401 may be configured to manage virtualization technology of the QEMU 402. When the on-chip system 106 is required to be maintained, the Libvirt 401 may enable the live migration to make sure normal operation of virtual machine business.

In a step 302, the QEMU 402 notifies a physical function drive program 403 to enable the migration; in other words, the QEMU 402 initializes a live migration start request. This embodiment provides a model to manage the whole process of the migration save path, and the model is a virtual machine learning unit QEMU object model (VMLU QOM) 404. The virtual machine learning unit refers to the virtualized artificial intelligence on-chip system 106 shown in FIG. 1, and the QEMU object model is a simulated PCIe.

More specifically, a function of the VMLU QOM 404 is to add one virtual PCIe device to the QEMU 402. The virtual PCIe device is registered in the QEMU 402 as an object model, and shows to the QEMU 402 that it has live migration capacity. The virtual PCIe device provides a dispatch routine function about the live migration, so that the QEMU 402 may be dispatched smoothly in the live migration. In this step, the QEMU 402 operates on the physical function drive program 403 through the dispatch routine function to notify and control the physical function drive program 403 to cooperate with the live migration.

Interaction between the user space 102 and the physical function drive program 403 is realized through memory mapping I/O (MMIO) of the VMLU QOM 404. MMIO is a part of a PCI (peripheral component interconnect) specification, and an I/O device is put in a memory space instead of an I/O space. From the perspective of the processor of the user space 102, after the MMIO, visiting other devices by the system is the same as visiting the memory, thereby simplifying difficulty of the program design and complexity of the interface.

In this step, the VMLU QOM 404 in the QEMU 402 initializes the live migration start request, and sends the live migration start request to the physical function drive program 403.

In a step 303, the physical function drive program 403 notifies a virtual function drive program 405 to initialize the migration. The virtual function drive program 405 is stored in a virtual machine kernel space. For the user space 102, based on what it sees during the live migration process is the virtual PCIe device, which has a readable and writable memory mapped I/O space., and read and write operations on the memory mapping I/O space (which is the on-chip system 106) by the virtual function drive program 405 may be caught and managed by the VMLU QOM 404. For the read operation, the VMLU QOM 404 may return a required return value according to the demand of the virtual function drive program 405 to make the virtual function drive program 405 and the physical function drive program 403 operate synchronously.

The VMLU QOM 404 obtains a migration state of the physical function drive program 403 through calling an interface of the physical function drive program 403. When the virtual function drive program 405 wants to read the MMIO space of the VMLU QOM 404, the VMLU QOM 404 may return a state of the physical function 406 to the virtual function drive program 405. In this step, the VMLU QOM 404 passes a state that the physical function drive program 403 is ready for the live migration to the virtual function drive program 405.

In a step 304, the virtual function drive program 405 suspends performing tasks from the user space 102. In a method adopted by this embodiment, the virtual function drive program 405 does not return a control right of the processor to an application of the user space 102, so that the guest operating system may keep waiting, and may not send a next task to the virtual function drive program 405 to suspend performing of tasks of the user space 102.

In a step 305, the virtual function drive program 405 notifies the physical function drive program 403 to make preparation for the migration. When an instruction from the user space 102 is suspended, the virtual function drive program 405 notices the physical function drive program 403 that the user space 102 is ready, so that there may be no instruction interference during the live migration.

In a step 306, the physical function drive program 403 notifies the physical function 406 to make preparation for the migration. The physical function drive program 403 sends the live migration start request to the physical function 406, and the live migration start request specifies a specific virtual hardware 408 to make live migration. The specific virtual hardware 408 is one of a plurality of virtual hardware of the on-chip system 106. For convenient description, it is assumed that the live migration start request is aiming at a specific virtual function 407 and its corresponding specific virtual hardware 408.

The specific virtual hardware 408 may be a specific virtual computation apparatus, such as the virtual computation apparatus 142 in FIG. 1. To-be-migrated information includes a configuration of the virtual computation apparatus 142, a computation intermediate value stored in the virtual shared storage unit, and data stored in the virtual storage unit core. The specific virtual hardware 408 may be the specific virtual storage apparatus 148 in FIG. 1, and the to-be-migrated information includes data stored in the specific virtual storage apparatus 148. The specific virtual hardware 408 may be the virtual video encoding and decoding apparatus 144 or the virtual JPEG encoding and decoding apparatus 146, and the to-be-migrated information includes the configuration of the virtual video encoding and decoding apparatus 144 or the configuration of the virtual JPEG encoding and decoding apparatus 146 and corresponding encoding and decoding information.

In a step 307, the physical function 406 uploads data of drive program of the specific virtual function 407, data of firmware and data of information of the specific virtual hardware 408, context information and state information to the physical function drive program 403. First, the physical function 406 sends an instruction to the physical function drive program 403 of the kernel space 104. The instruction records information relates to the specific virtual hardware 408, which makes the physical function drive program 403 know how much data is required to be migrated. At this time, the VMLU QOM 404 is at a stop and copy stage, and may not allocate physical resources to the user space 102. Therefore, the user space 102 has no time slice to operate the application, thereby a relevance between the user space 102 and the specific virtual function 407 is interrupted, but other virtual functions and their corresponding virtual hardware may be operated as usual. After idling the specific virtual function 407, the physical function 406 may take out the to-be-migrated information in batches from the specific virtual hardware 408, and send the to-be-migrated information to the physical function drive program 403. After sending the to-be-migrated information, the physical function 406 sends an end signal to the physical function drive program 403.

In a step 308, the VMLU QOM 404 obtains the to-be-migrated information from the physical function drive program 403. The physical function drive program 403 of the kernel space sends the to-be-migrated information to the VMLU QOM 404.

In a step 309, the VMLU QOM 404 embeds the to-be-migrated information to a to-be-migrated instruction, and sends the to-be-migrated instruction to the Libvirt 401.

In a step 310, after sending the to-be-migrated instruction, the physical function 406 releases resources of the specific virtual hardware 408 and the specific virtual function 407; the VMLU QOM 404 sends the end signal to the virtual function drive program 405; the virtual function drive program 405 sends a control signal to an interface 409 of the virtual function drive program; and the guest operating system restarts to send tasks. A whole migration save path is ended.

More specifically, the system in FIG. 4 further includes a serializer 410 configured to respond to the live migration start request. In a step 307, the serializer serializes data of a drive program of the specific virtual function 407, data of a firmware, data of information of the specific virtual hardware 408, data of context information and state information to generate to-be-migrated information, and the to-be-migrated information is uploaded to the physical function drive program 403. The serializer 410 of the embodiment may be implemented through hardware or firmware. If the serializer is realized through the hardware, the serializer 410 is configured in the on-chip system 106; if the serializer is realized through the firmware, the serializer 410 is stored in an ROM of the on-chip system 106.

In order to make sure that the destination server may complete the migration recovery path successfully, the to-be-migrated information generated in the step 307 is required to abide by a protocol. The source server generates the to-be-migrated information based on the protocol, and then the destination server interprets the to-be-migrated information according to the protocol, so that the configuration and the data may be recovered correctly. In order to describe state and data of the specific virtual function 407 and the specific hardware 408 completely, a data structure of the to-be-migrated information specified by the protocol of the embodiment is shown as FIG. 5. The serializer 410 generates three layers under this protocol: a protocol layer 51, a data structure layer 52 and a serialization layer 53.

The protocol layer 51 is configured to record a protocol version, attribute of data, and length of the to-be-migrated information. In this embodiment, the serializer 410 generates 10 identifiers in the protocol layer 51, which are: a magic number identifier 501, a version identifier 502, a request response identifier 503, a command identifier 504, a serial number identifier 505, a data source identifier 506, a byte identifier 507, a domain identifier 508, a retention identifier 509 and a load identifier 510. The following describes functions of these identifiers.

The magic number identifier 501 is set to four bytes, and is configured to indicate a start of the to-be-migrated information. More specifically, the magic number identifier 501 has a fixed character. When the destination server receives an instruction, as long as the character in the magic number identifier 501 is identified, the destination server may know that this is the to-be-migrated information, and then may start the operation of the migration recovery path.

The version identifier 502 is set to 2 bytes, and is configured to indicate a version of the to-be-migrated information. As mentioned before, if a system version of the source server is different from a system version of the destination server, especially when the system version of the source server is higher than the system version of the destination server, compatibility problems may occur. In order to make the destination server judge whether there is compatibility problems between the source server and the destination server, the protocol layer 51 uses the version identifier 502 to record a version of the to-be-migrated information; in other words, the protocol layer 51 uses the version identifier 502 to record the system version of the source server.

The request response identifier 503 is set to 1 byte, and is configured to represent whether the instruction is a request instruction or a response instruction.

The command identifier 504 is set to 1 byte, and is configured to indicate task types of the to-be-migrated information. Task types of this embodiment include migration state/data and data dictionary updating. The migration state and data are described before and may not be repeated here. The data dictionary refers to definition and description of a data item, a data structure, a data flow, data storage and processing logic of the data. The data dictionary aims at describing each element of the data in detail. In short, the data dictionary is an information set about the data, and is a definition set of data elements used in the system. Data dictionary updating refers to definition and description of the data item, the data structure, the data flow, the data storage and the processing logic of the data.

The serial number identifier 505 is set to 4 bytes, and is configured to record a serial number of the to-be-migrated information. The serial number corresponds to an order of the to-be-migrated information.

The data source identifier 506 is set to 2 bytes, and is configured to record which apparatus does information in the to-be-migrated information come from. The information in the to-be-migrated information come from the specific hardware 408, which is at least one of the virtual computation apparatus, virtual video encoding and decoding apparatus, virtual JPEG encoding and decoding apparatus and virtual storage apparatus that are about to perform live migration, and the specific hardware 408 corresponds to the specific virtual function 407.

The byte identifier 507 is set to 8 bytes, and is configured to indicate an overall number of the bytes of the to-be-migrated information or an overall number of the bytes of a play load.

The domain identifier 508 is configured to indicate the specific virtual function that is about to perform live migration, which is the specific virtual function 407 in FIG. 4.

The retention identifier 509 is set to 2 bytes and is reserved for use when other information is required to be recorded in the future.

The load identifier 510 is configured to record information of the data structure layer 52. The data structure layer 52 is configured to represent a structure of the to-be-migrated information. For the live migration, a relevance between a data topology and the data structure does not need to be described in detail, since the source server and the destination server have similar or even a same frame. Therefore, the data structure layer 52 of this embodiment does not need to record much information, but only needs to let the destination server has enough information to understand the to-be-migrated information of the source server.

The to-be-migrated information of the present disclosure is divided into two types: configuration and data.

When the to-be-migrated information is the configuration, in this embodiment, a protocol frame generated by the serializer 410 in the data structure layer 52 is shown as a configuration frame 54, including a domain generation identifier 511, a chip identifier 512, a board card identifier 513, a micro-controller identifier 514, a firmware identifier 515, a host driver identifier 516, a virtual machine identifier 517, a retention identifier 518, a computation apparatus identifier 519, a storage apparatus identifier 520, a video encoding and decoding apparatus identifier 521, a JPEG encoding and decoding apparatus identifier 522, a PCIe identifier 523 and a retention identifier 524.

The domain generation identifier 511 is configured to indicate the specific virtual function 407; the chip identifier 512 is configured to record a model of a chip set of the source server; and the board card identifier 513 is configured to record a version or a model of the board card of the source server.

The micro-controller identifier 514 is configured to record a version of a micro-controller of the source server. The micro-controller is a general control component in the on-chip system 106, and is configured to detect or control environment of the server. For example, the micro-controller is configured to detect or control temperature and operating frequency of the server and the like.

The firmware identifier 515 is configured to record a firmware version of the source server; the host driver identifier 516 is configured to record a host drive software version of the source server; the virtual machine identifier 517 is configured to record a virtual machine drive software version of the source server; the retention identifier 518 and the retention identifier 524 are not used temporarily, but are reserved for use when other information is required to be recorded in the future.

The computation apparatus identifier 519, the storage apparatus identifier 520, the video encoding and decoding apparatus identifier 521, the JPEG encoding and decoding apparatus identifier 522 are called as specific apparatus identifiers, and are configured to record configuration of the specific hardware 408 in FIG. 4. More specifically, the computation apparatus identifier 519 is configured to record configuration of a virtual computation apparatus (such as the virtual computation apparatus 142 in FIG. 1) of the source server; the storage apparatus identifier 520 is configured to record configuration of the virtual storage apparatus (such as the virtual storage apparatus 148 in FIG. 1) of the source server; the video encoding and decoding apparatus identifier 521 is configured to record configuration of the virtual video encoding and decoding apparatus (such as the virtual video encoding and decoding apparatus 144 shown in FIG. 1) of the source server; the JPEG encoding and decoding apparatus identifier 522 is configured to record configuration of the virtual JPEG encoding and decoding apparatus (such as the virtual JPEG encoding and decoding apparatus 146 shown in FIG. 1) of the source server.

The PCIe identifier 523 is configured to record configuration of the virtual interface (such as the virtual interface 140 in FIG. 1) of the source server. The virtual interface refers to a PCIe virtual interface designated to the specific virtual function 407.

When the to-be-migrated information is data information, the data information is stored in a memory originally. The memory is a virtual storage unit that may be directly accessed by the specific hardware 408. The memory may be an internal storage space of the virtual computation apparatus 142, the virtual video encoding and decoding apparatus 144 or the virtual JPEG encoding and decoding apparatus 146, such as a virtual shared storage unit in the virtual computation apparatus 142. The memory may also be the virtual storage apparatus 148. The serializer 410 may generate a data frame 55 to carry information. In this embodiment, it is considered that in some complicated scenarios, relevance between data is required to be described, so that the serializer 410 adopts a specific signal to show the relevance between the data to make the destination server recover the data completely and accurately according to the information.

The data information recorded by the data structure layer 52 may be a plurality of pieces of data of different types but has relevance. The serializer 410 of this embodiment defines a struct according to the relevance between the data. The struct includes at least one type, and each type is composed of at least one variable (data). In other words, a plurality of relevant variables are integrated into one type, and a plurality of relevant types are integrated into one struct. Such structs, types, variables and their relevance are all stored in the above mentioned memory.

When indicating the struct, the serializer 410 may add a prefix in front of the struct as a starting signal of the struct. In this embodiment, a string is used as a prefix signal, and the prefix signal may be any non-English letters and non-number characters like ".", "$", "!", "#", "%", "&", "*", "-" and the like. For convenient description, the following may uniformly use a period "." as the prefix signal.

Specifically, the data frame 55 generated by the serializer 410 includes a signal identifier 525, a type identifier 526, a key identifier 527 and an entity identifier 528. Such identifiers are used to describe and record the structs, the types and the variables.

The signal identifier 525 is configured to indicate a start of the struct or a start of the data frame 55. The serializer 410 inserts the prefix signal and name of the struct in the signal identifier 525 according to the protocol. Taking a name "foo_nested" of the struct as an example, the signal identifier 525 is recorded as ".foo_nested". Since the source server and the destination server abide by the same protocol, when identifying the prefix signal ".", the destination server knows that the name of the struct is followed after the prefix signal, and the following identifiers are all descriptions related to the struct.

The type identifier 526 is configured to record every kind of types under the struct, and the type includes a tree, an image, a linked list, a heap, an integer, a floating point number and the like. A name of the type may be defined by the serializer 410 or may be the name used by the data storage in the memory. For example, an integer a (with a value of 20) and an integer b (with a value of 10) may be defined as the same type under the struct. The serializer 410 names this type as "foo_nested_t", and the type identifier 526 records type names of the integer a and the integer b as "foo_nested_t".

The key identifier 527 is configured to record a variable name under the type. When indicating the variable, according to the protocol, the serializer 410 may add a prefix in front of the variable name. The prefix is: content of the signal identifier 525 + the prefix signal + the variable name. Taking the above mentioned integer a and the integer b as examples, since the type "foo_nested_t" has two variables, which are the integer a and the integer b, the serializer 410 describes the integer a first in the data frame 55. Therefore, the key identifier 527 of the integer a is ".foo_nested.a". The entity identifier 528 then records the value of the variable, since the value of the integer a is 20, the entity identifier 528 directly records "20".

Since the type "foo_nested_t" has another variable b, after describing the key identifier 527 and the entity identifier 528 of the integer a, the serializer 410 describes the key identifier 527 and the entity identifier 528 of the integer b, and the key identifier 527 and the entity identifier 528 may be recorded as ".foo_nested.b" with the value "10".

The record of the struct "foo_nested" in the data structure layer 52 is shown as FIG. 6. From the above description, when describing one struct in the to-be-migrated information, this embodiment records the name of the struct in the signal identifier 525, records the type names under the struct in the type identifier 526, records the variable names under the struct in the key identifier 527, and records the variable values or strings in the entity identifier 528. If one type has a plurality of variables, after describing the type identifier 526 of the type, the key identifier 527 and the entity identifier 528 may be repeated until all the variables are described. If the struct has a plurality of types, a first type and all variables of the first type may be described, and then a second type and all variables of the second type may be described and so on, until all types and variables of the struct are described.

If the variable is a simple structure such as a value, a string, a sequence or a list, the data frame 55 is enough to record all information. If the variable has a complicated structure, the entity identifier 528 may be further unfolded to a serialization layer 53 to serialize the complicated structure. Back to FIG. 5, the serializer 410 generates a magic number identifier 529, a length identifier 530, a byte order identifier 531, a compression identifier 532, a type identifier 533, a key identifier 534, a counting identifier 535, a format identifier 536 and a value identifier 537 under the serialization layer 53.

The magic number identifier 529 is a specific character configured to indicate a start of a new data segment, which is the start of the serialization layer 53. When reading the magic number identifier 529, the destination server may know the following is information of the serialization layer 53 and may perform corresponding processing.

The length identifier 530 is configured to represent the length of the serialization layer 53.

The byte order identifier 531 is configured to represent storage endian of data in the serialization layer 53, and the data is generally stored in a big-endian mode or in a little-endian mode. In the big-endian mode, a high byte of the data is stored in a low address of the memory, and a low byte of the data is stored in a high address of the memory. Such a storage model is similar to the method that the data is treated as a string and processed in sequence; in other words, addresses are increased from small to large, and data is stored from the high bit to the low bit. In the little-endian mode, a high byte of the data is stored in a high address of the memory, but a low byte of the data is stored in a low address of the memory. Such a storage model effectively combines the high address, the low address and byte of the data, where the high address has a high weight, and the low address has a low weight.

The compression identifier 532 is configured to indicate a compression form of data information. In transmission, the data may be properly compressed to decrease a transmission volume. This embodiment does not limit a compression form, but a preferable form is BDI (base delta immediate) compression.

The type identifier 533 is configured to indicate a type of data information. The type identifier 533 and the type identifier 526 record different contents. The type identifier 526 is configured to record all kinds of types under the struct, and the type identifier 533 is configured to indicate a type of the data itself.

The key identifier 534 is configured to indicate variable names under the type in the type identifier 533.

The counting identifier 535 is configured to indicate a quantity of variables under the type in the type identifier 533.

The format identifier 536 is configured to indicate formats of the variables under the type in the type identifier 533. For example, int 16, int 32 and int 64 respectively represent a 16-bit integer, a 32-bit integer and a 64-bit integer.

The value identifier 537 records a value or a string of the variable. In this embodiment, if one variable has a plurality of values, a plurality of value identifiers 537 may directly follow the format identifier 536 to respectively record each value. For example, if one variable is a list that contains 128 values, the type identifier 533 indicates the data as a list, and the counting identifier 535 indicates that there are 128 values; and there may be 128 value identifiers 537 to respectively store the 128 values.

Figure 7:
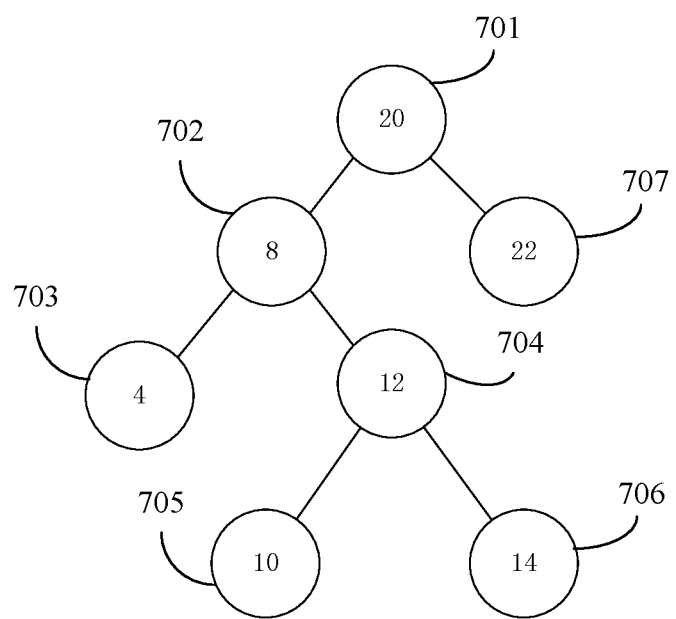
FIG. 7 shows exemplary tree data according to an embodiment of the present disclosure.

Complicated data like tree data, nested data or logical pointer and the like need to use the serialization layer 53. The tree data refers to a binary tree, which is a tree structure type. The binary tree is a set of a plurality of elements (nodes). The set is either empty, or is composed of an element called root and two disjoint binary trees called the left and the right binary trees respectively, where the binary trees are ordered trees. The FIG. 7 shows exemplary tree data, including a node 701 to a node 707, where each node has a corresponding value; for example, a value of the node 701 is 20, and a value of the node 702 is 8. The nested data means adding one or more data formats of forms, images, layers or functions to existed forms, images, layers or functions. The logical pointer means that one struct points to another struct through adding an identifier, which establishes relevance between structs. The following may describe how the serializer 410 serializes the tree data, the nested data or the logical pointer one by one.

When the data is the tree data, the serializer 410 indicates a start of information of the tree data at the magic identifier 529, records length of the serialization layer 53 at the length identifier 530, indicates whether the tree data is stored in a big-endian model or in a little-endian model at the byte order identifier 531, indicates a compression form of the tree data at the compression identifier 532, indicates the tree data as a binary tree at the type identifier 533, indicates a variable name of the tree data at the key identifier 534, indicates a quantity of elements in the tree data at the counting identifier 535, and indicates element formats of the tree data at the format identifier 536.

The value identifier 537 records each element value of the tree data. When recording these values, the tree data is required to be serialized first; in other words, the binary tree may be traversed according to a specific order to form serialized data. The specific order may be appointed in the protocol, and may be one of a preorder, an inorder, a postorder or a reverse postorder, and then the traversed value may be placed in the value identifier 537 in turn.

For the current tree data, when adopted the preorder, a root node may be output first, and then a left subtree, and then a right subtree is output until there is no left subtree. Taking the tree data in FIG. 7 as an example. The root node of the tree data is a node 701, so that the node 701 with the value 20 is recorded, and then a left subtree node 702 with the value 8 is recorded, and then a left subtree node 703 with the value 4 is recorded; a node 703 does not have a left subtree, so it is recorded as NIL (which means empty); then a right subtree of the node 703 is output, since the node 703 does not have a right subtree, it is recorded as NIL again; then back to the upper node 702, a right subtree of the node 702 is a node 704 with a value 12, which is recorded; a left subtree of the node 702 is a node 705 with a value of 10, which is recorded; the node 705 does not have a left subtree and a right subtree, which are respectively recorded as NIL; back to a right subtree node 706 of the node 704, its value 14 is recorded; the node 706 does not have a left subtree and a right subtree, which are respectively recorded as NIL; back to the root node 701, whose right subtree is a node 707, and the value 22 of the node 707 is recorded; and the node 707 does not have a left subtree and a right subtree, which are respectively recorded as NIL, and then the traversal process is ended. Therefore, when the serializer 410 traverses the tree data in FIG. 7 with the preorder, the obtained serialized data is: 20, 8, 4, NIL, NIL, 12, 10, NIL, NIL, 14, NIL, NIL, 22, NIL and NIL, and the value identifier 537 is shown in FIG. 8.

For the current node, when adopted the inorder, a left subtree is output, then the node is output, and a right subtree is output at last. Taking the FIG. 7 as an example, when the serializer 410 traverses with the inorder, the obtained serialized data is: NIL, 4, NIL, 8, NIL, 10, NIL, 12, NIL, 14, NIL, 20, NIL, 22 and NIL.

For the current node, when adopted the postorder, the left subtree is output, then the right subtree is output, and the node is output at last. Taking the FIG. 7 as an example, when the serializer 410 traverses with the postorder, the obtained serialized data is: NIL, NIL, 4, NIL, NIL, 10, NIL, NIL, 14, 12, 8, NIL, NIL, 22 and 20.

The reverse postorder means reversing the result of the postorder. Taking the FIG. 7 as an example, when the serializer 410 traverses with the reverse postorder, the obtained serialized data is: 20, 22, NIL, NIL, 8, 12, 14, NIL, NIL, 10, NIL, NIL, 4, NIL and NIL.

By adopting one of the above mentioned methods, the serializer 410 converts the tree data to serialized data, and places the serialized data to the value identifier 537. This embodiment does not limit the method of traversing the tree data, but the preorder method is preferable.

When processing the nested data, since the nested data has a hierarchy, the nested data is required to be recorded with serialization according to layers in performing the live migration save. Actually, the nested data may include a plurality of layers of nested structure. For convenient description, the following may take nested data with two-layer data as an example.

The serializer 410 shows the nested data in a manner of the struct, which are divided into a first layer struct (the upper struct) and a second layer struct (the under struct); in other words, the second layer struct is nested in the first layer struct. When generating the to-be-migrated information, the serializer 410 may be divided into two segments. The signal identifier 525 (a first signal identifier), the type identifier 526 (a first type identifier), the key identifier 527 (a first key identifier) in the first segment record related information of the first layer struct. The serialization layer 53 of the first layer struct is unfolded in the entity identifier 528 (a first entity identifier).

Identifiers generated by the serialized 410 in the serialization layer 53 of the first layer struct are as follows: the magic number identifier 529 indicates a start of serialization of the first layer struct, the length identifier 530 records the length of the serialization layer 53 in the first layer struct, the byte order identifier 531 represents whether the first layer struct is stored in a big-endian model or in a little-endian model, the compression identifier 532 indicates a compression form of the first layer struct, the type identifier 533 indicates the type of the first layer struct, the key identifier 534 indicates variable names in the first layer struct, the counting identifier 535 indicates a quantity of variables in the first layer struct, the format identifier 536 indicates variable formats of the first layer struct, and the value identifier 537 records a value of each variable in the first layer struct.

Following the entity identifier 528 of the first layer struct, the serializer 410 then generates a described second layer struct. The serializer 410 generates the key identifier 527 (a second key identifier) to record a name of the second layer struct, and unfolds the serialization layer 53 of the second layer struct in the entity identifier 528 (a second entity identifier). The recording method of each identifier of the serialization layer 53 of the second layer struct is the same to that of the first layer struct, which may not be repeated here.

For example, supposing the nested data is as follows:

```
typedef struct foo1_t {
    int integer;
    const char *str;
}foo1_t;
typedef struct foo_nested_t {
    int  array [3];
    unsigned int seq;
    foo1_t  foo1;
}foo_nested_t;
foo_nested_t foo_nested = {26, 91, 1029,},
                         {91, "Hello world",},
                         10029,};
```

The above mentioned codes represent that the nested data includes two layers of struct. The first layer struct is called as "foo_nested", including three types. A first type is an integer number array, a name of the variable is "array", and the array is {26, 91, 1029}; a second type is the second layer struct, including a number 91 and a string Hello world; and a third type is an integer number 10029.

Figure 9:
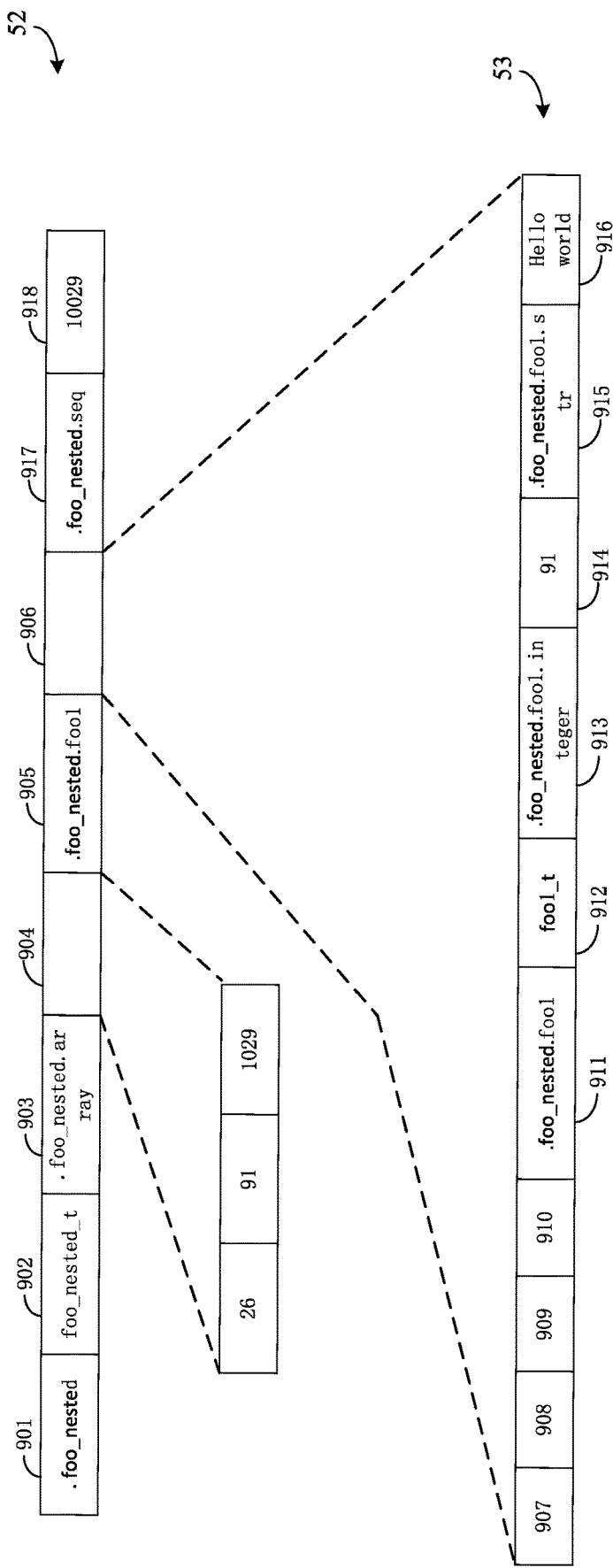
FIG. 9 shows a data structure generated in serializing nested data.

FIG. 9 is a data structure generated in nested data serialization. FIG. 9 is only used to show the serialization of the nested data, so that identifiers of the protocol layer 51 are omitted. In the data structure layer 52 generated by the serializer 410, a first signal identifier 901 records the name of the first layer struct, which is ".foo_nested"; a first type identifier 902 records the type of the first layer struct, which is "foo_nested_t"; and a first key identifier 903 and a first entity identifier 904 record information of the integer number array {26, 91, 1029} of the first type, where the first key identifier 903 records a variable name ".foo_nested.array", and the first entity identifier 904 records 3 values of the array, which are integer numbers 26, 91 and 1029. Since the array is simple data, the first entity identifier 904 does not need to unfold the serialization layer 53.

Information of the second type is recorded after information of the first type is described. Following the first entity identifier 904, the second key identifier 905 records the second type. The second type is a second layer struct of the nested data, whose name is "foo1". According to the protocol, the second key identifier 905 records the second type as ".foo_nested.foo1", representing a struct nested under the "foo1" struct of the "foo_nested" struct.

The serializer 410 unfolds the serialization layer 53 at the second entity identifier 906 to represent the second layer struct. A magic number identifier 907 indicates a start of the second layer struct; a length identifier 908 records the length of the serialization layer 53; a byte order identifier 909 represents if the second layer is stored in a big-endian model or in a little-endian model; a compression identifier 910 indicates a compression form of the second layer struct; a second signal identifier 911 records a name of the second layer struct, which is ".foo_nested.foo1" according to the protocol; and a second type identifier 912 records a type name of the second layer struct, which is "foo1_t". Since data {91, "Hello world"} in the second layer struct includes a number "91" and a string "Hello world". The serializer 410 may use a set of key identifiers and a set of entity identifiers to record information of the number and the string respectively. A third key identifier 913 and a third entity identifier 914 are configured to record the number, where the third key identifier 913 records a name of the variable ".foo_nested.foo1.integer", and the third entity identifier 914 records the value "91". A fourth key identifier 915 and a fourth entity identifier 916 are configured to record the string, where the fourth key identifier 915 records a variable name ".foo_nested.foo1.str", and the fourth entity identifier 916 records the string "Hello world".

Information of the third type is recorded at the data structure layer 52 after information of the second type is indicated. After the second entity identifier 906, the serializer 410 adds a fifth key identifier 917 to record a variable name of the third type, which is ".foo_nested.seq"; and the serializer 410 adds a fifth entity identifier 918 to record a variable value of the third type, which is "10029". So far, the serializer 410 loads all information of the nested data to the to-be-migrated information.

When serializing the logical pointer, the serializer 410 uses the data structure layer 52 and the serialization layer 53 to describe relations of a pointer direction completely.

For example, supposing there are following structs:

```
typedef struct foo1_t {
    int integer;
}foo1_t;
typedef struct foo_nested_t {
    foo1_t *foo1;
    unsigned int seq;
}foo_nested_t;
foo1_t foo1 = {91, "Hello world"};
foo_nested_t foo_nested = { &foo1,
                            10029};10029};
```

The above mentioned codes represent the first struct, whose name is "foo_nested". The first struct includes a first type, whose name is "foo_nested_t", and the first type includes two variables. A first variable is a logical pointer "foo1", which points to a second struct foo2, and a second variable is an integer with a value of 10029, whose name is seq. The second struct foo2 also includes a second type, whose name is "foo2_t". The second type includes an integer variable with a value of 91, whose name is "interger".

Figure 10:
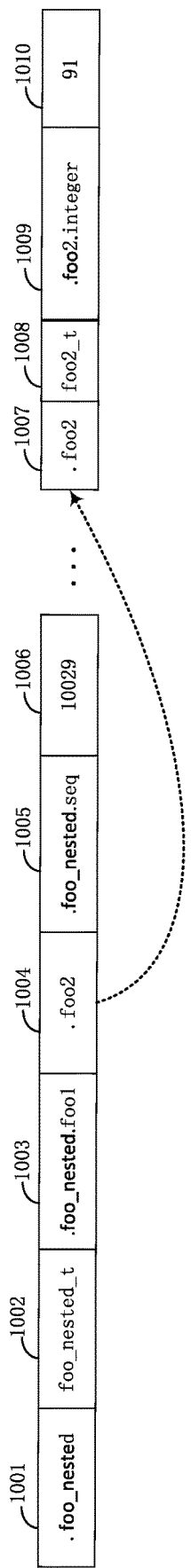
FIG. 10 is a schematic diagram of serializating a struct including a logical pointer to to-be-migrated information by a serializer.

FIG. 10 is a schematic diagram of serializing the struct including a logical pointer to to-be-migrated information by the serializer 410. Similarly, FIG. 10 is only used to show the logical pointer serialization, so that identifiers of the protocol layer 51 are omitted. In the data structure layer 52, the serializer 410, according to the protocol, makes the first signal identifier 1001 record the name of the first struct, which is ".foo_nested"; makes a first type identifier 1002 record the name of the first type, which is "foo_nested_t"; and makes a first key identifier 1003 and a first entity identifier 1004 record information of the logical pointer. The first key identifier 1003 records a name of the logical pointer as ".foo_nested.foo1" according to the protocol, and the first entity identifier 1004 records that the logical pointer points to ".foo2". Then a second key identifier 1005 and a second entity identifier 1006 record information of a second variable. The second key identifier 1005 records a name of the second variable as ".foo_nested.seq". The second entity identifier 1006 records a value of the second variable as "10029".

The serializer 410 may properly insert information of the second struct foo2 in one segment in the same data structure of the to-be-migrated information. As shown in FIG. 10, information of a plurality of other structs exists after the second entity identifier 1006. In a segment of the data structure layer 52, the serializer 410 continues to record the information of the second struct. A second signal identifier 1007 records the name of the second struct, which is ".foo2". The English period is used for the system to recognize that this is a sign identifier, which is a beginning of struct information. A second type identifier 1008 records a name of the second type, which is "foo2_t". A third key identifier 1009 and a third entity identifier 1010 record information of a variable in the second type. The third key identifier 1009 records a name of the variable as ". foo2.integer". The third entity identifier 1010 records a value of the variable as "91".

FIG. 10 is an example of the logical pointer. Since the variable is easy enough, the first entity identifier 1004, the second entity identifier 1006 and the third entity identifier 1010 do not need to unfold the serialization layer 53 shown as FIG. 5. The present disclosure does not ask or limit that each data structure of the to-be-migrated information includes the serialization layer 53 or each identifier of the serialization layer 53.

In conclusion, when generating the to-be-migrated information, the serializer 410 may splice a plurality of identifiers according to real demands to extent the length of the data structure layer 52 and the length of the serialization layer 53 properly, and then record the overall number of the byte of the to-be-migrated information to the byte identifier 507. In other words, the data structure layer 52 and the serialization layer 53 may include a plurality of signal identifiers, type identifiers, key identifiers or entity identifiers, which are strung together to respectively record different data entities.

After the serializer 410 generates the to-be-migrated information, the physical function 406 sends to-be-migrated information in the step 307 to the physical function drive program 403 of the kernel space 104 to finish the process of data serialization.

Figure 11:
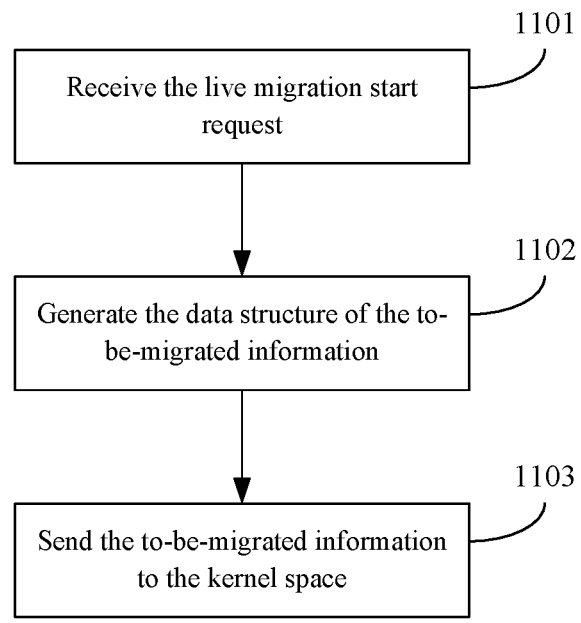
FIG. 11 is a flowchart of generating a data structure of the to-be-migrated information.

Another embodiment of the present disclosure is a method for saving path when implementing the live migration to the system. More specifically, this embodiment generates a flowchart of the data structure of the to-be migrated information in the step 307, and FIG. 11 shows its flowchart.

In a step 1101, the live migration start request is received; and the live migration start request specifies a live migration of specific virtual function, where the specific virtual function is one of the plurality of virtual functions. In the step 306 of FIG. 3, the physical function drive program 403 sends the live migration start request to notify the physical function 406 to prepare for the migration, and the physical function 406 receives the live migration start request, which specifies the specific virtual function 407 to make live migration.

Figure 12:
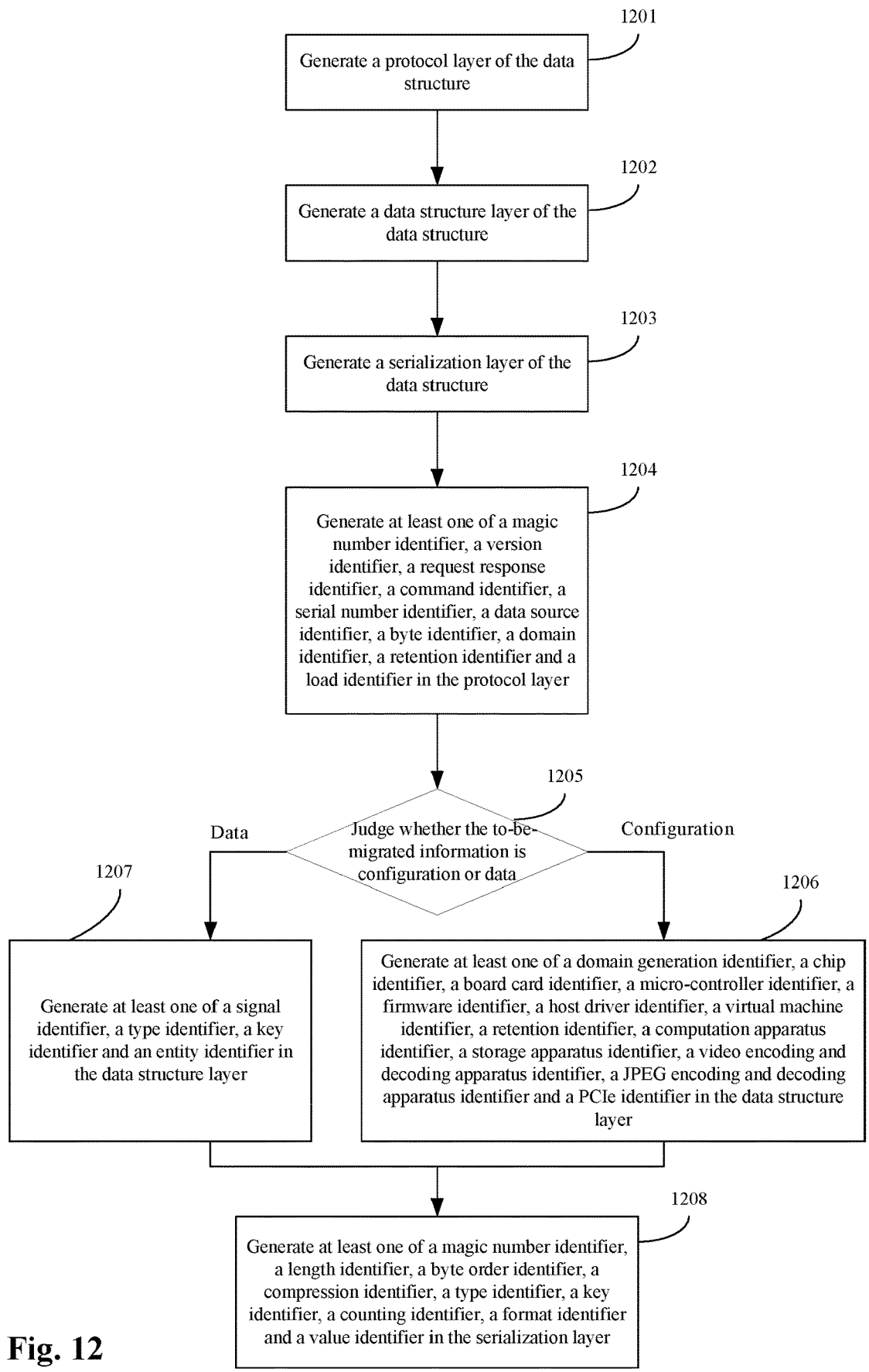
FIG. 12 is a flowchart of generating the data structure of the to-be-migrated information.

In a step 1102, the data structure of the to-be-migrated information is generated. In response to the live migration start request, the serializer 410 generates the data structure of the to-be-migrated information. The step may be refined to a flowchart shown in FIG. 12.

In a step 1201, a protocol layer of the data structure is generated; in a step 1202, a data structure layer of the data structure is generated; and in a step 1203, a serialization layer of the data structure is generated.

In a step 1204, at least one of a magic number identifier, a version identifier, a request response identifier, a command identifier, a serial number identifier, a data source identifier, a byte identifier, a domain identifier, a retention identifier and a load identifier is generated in the protocol layer.

In a step 1205, it is judged whether the to-be-migrated information is configuration or data.

If the to-be-migrated information is a configuration, a step 1206 is performed, in this step, at least one of a domain generation identifier, a chip identifier, a board card identifier, a micro-controller identifier, a firmware identifier, a host driver identifier, a virtual machine identifier, a retention identifier, a computation apparatus identifier, a storage apparatus identifier, a video encoding and decoding apparatus identifier, a JPEG encoding and decoding apparatus identifier and a PCIe identifier is generated in the data structure layer.

If the to-be-migrated information is data, the step 1207 is performed, where generating at least one of a signal identifier, a type identifier, a key identifier and an entity identifier in the data structure layer.

Then a step 1208 is performed, in this step, at least one of a magic number identifier, a length identifier, a byte order identifier, a compression identifier, a type identifier, a key identifier, a counting identifier, a format identifier and a value identifier is generated in the serialization layer.

Definitions and contents of these identifiers are described in the above mentioned embodiments, and details may not be repeated here.

A step 1103 is performed at last: sending the to-be-migrated information to the kernel space. After the serializer 410 generates the to-be-migrated information, the physical function 406 sends the to-be-migrated information to the physical function drive program 403 of the kernel space 104.

Figure 13:
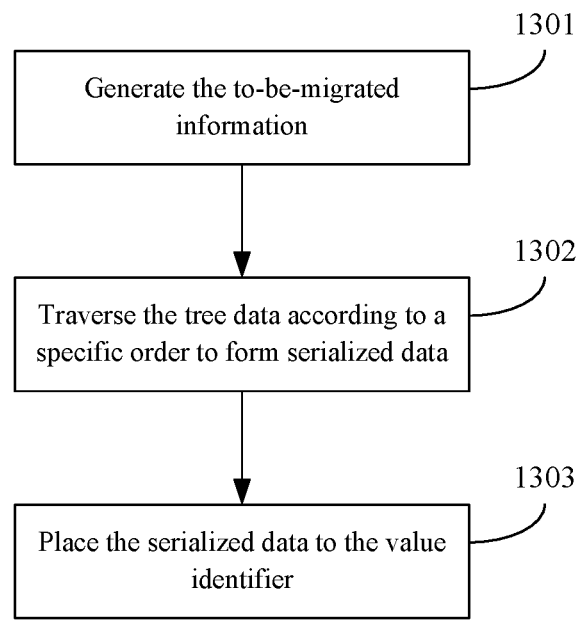
FIG. 13 is a flowchart of serializing tree data according to an embodiment of the present disclosure.

Another embodiment of the present disclosure is a method of tree data serializaion, whose flowchart is shown as FIG. 13, and the flowchart includes the following steps. In a step 1301, the to-be-migrated information is generated in response to the live migration start request, where the data structure of the to-be-migrated information includes a value identifier; in a step 1302, the tree data is traversed according to a specific order to form serialized data; and in a step 1303, the serialized data is placed in the value identifier. Details of serializing the tree data are described in the above mentioned embodiments, and may not be repeated here.

Figure 14:
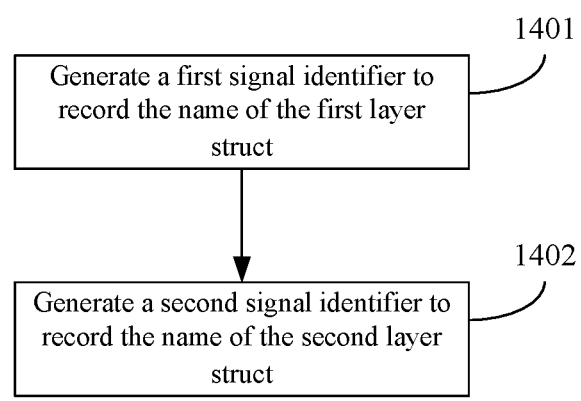
FIG. 14 is a flowchart of generating the to-be-migrated information according to an embodiment of the present disclosure.

Another embodiment of the present disclosure is a method of serializing the nested data. The nested data at least includes a first layer struct and a second layer struct. The serializer 410 generates the to-be-migrated information in response to the live migration start request, and steps of generating the to-be-migrated information are shown as FIG. 14. In a step 1401, a first signal identifier is generated in the data structure layer of the to-be-generated information, and the first signal identifier is configured to record the name of the first layer struct; and in a step 1402, a second signal identifier is generated in the serialization layer, where the second signal identifier is configured to record the name of the second struct. Details of the nested data are described in the above mentioned embodiments, and may not be repeated here.

Figure 15:
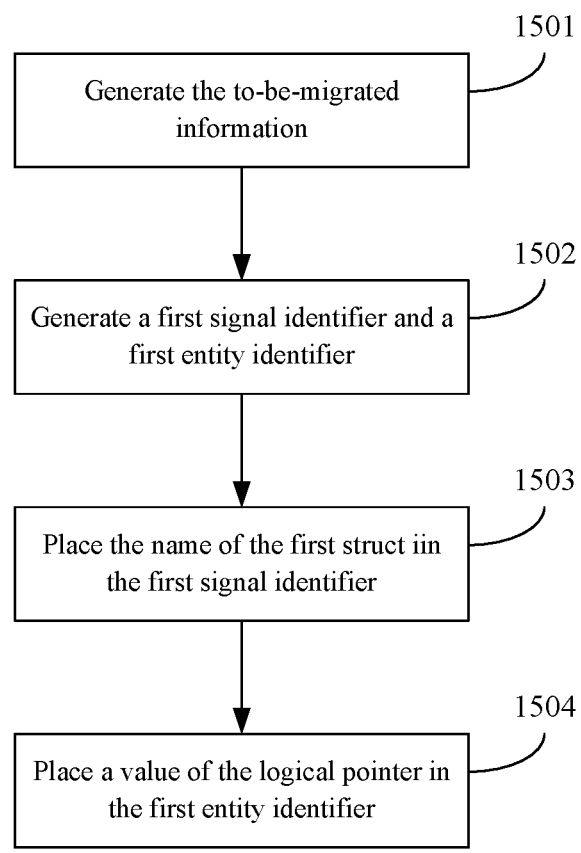
FIG. 15 is a flowchart of serializing the logical pointer according to an embodiment of the present disclosure.

Another embodiment of the present disclosure is a method of serializing the logical pointer. In this method, relevance is created between the first struct and the second struct, and the flowchart is shown as FIG. 15, which includes the following steps. In a step 1501, the to-be-migrated information is generated in response to the live migration start request; in a step 1502, a first signal identifier and a first entity identifier are generated in the data structure of the to-be-generated information; in step a 1503, the name of the first struct is placed in the first signal identifier; and in a step 1504, a value of the logical pointer is placed in the first entity identifier, where the value of the logical pointer is the name of the second struct. Details of the logical pointer are described in the above mentioned embodiments, and may not be repeated here.

Through the descriptions of the above-mentioned embodiments, the present disclosure implements data serialization in a migration save path. When performing the above-mentioned process, the non-specific virtual function and the hardware may still perform tasks from the user space 102 without being affected.

Figure 16:
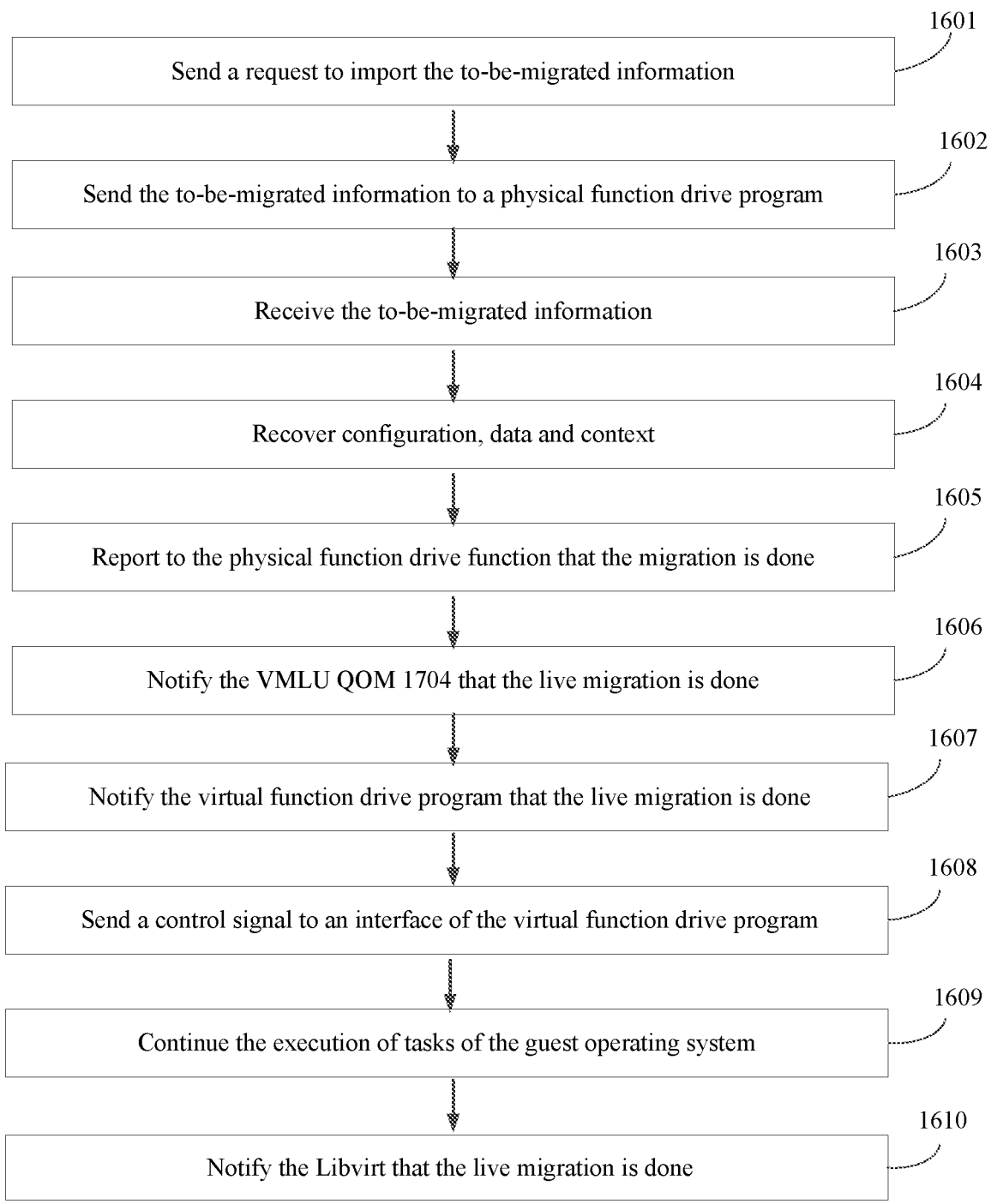
FIG. 16 is a flowchart of recovering migration path according to an embodiment of the present disclosure.
Figure 17:
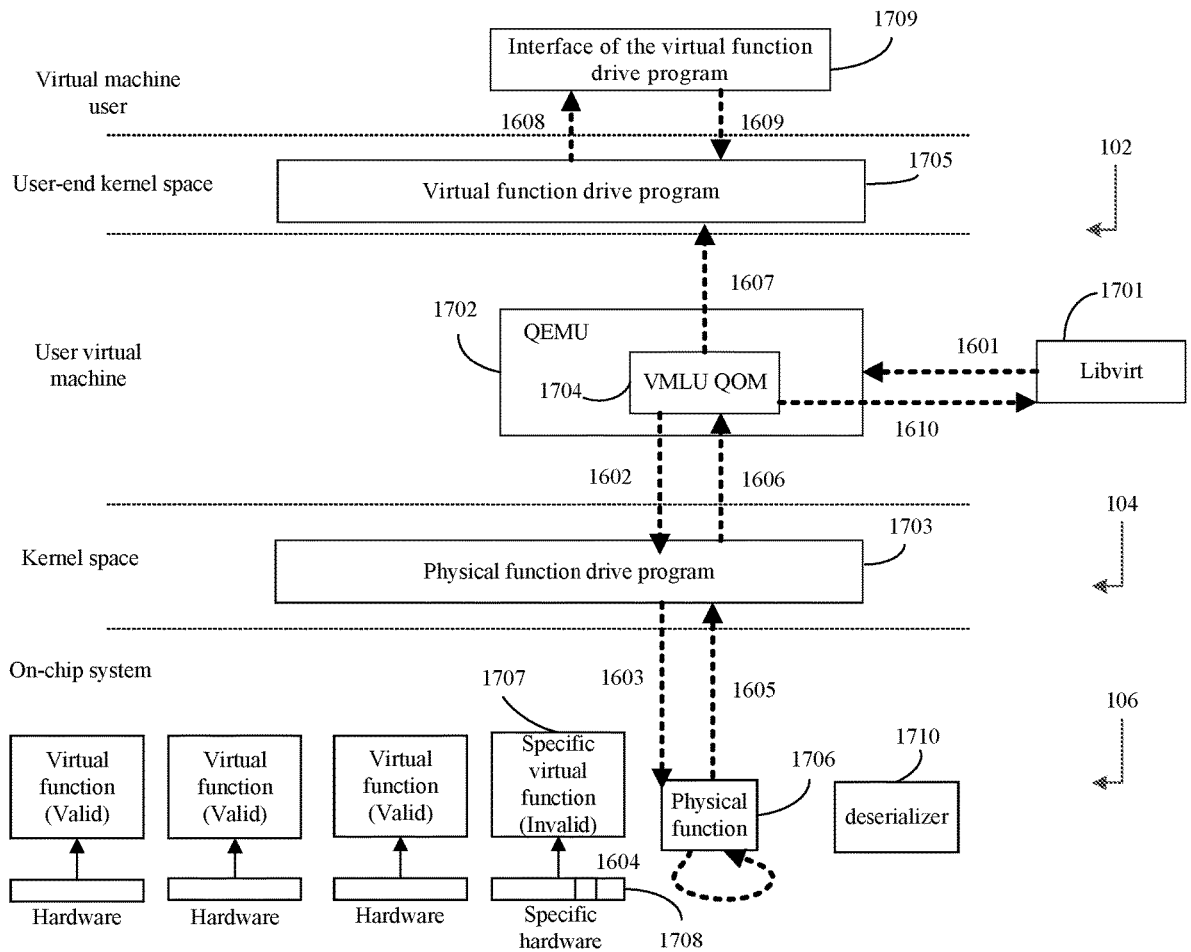
FIG. 17 is a schematic diagram of recovering path when implementing migration on a destination server side according to an embodiment of the present disclosure.

Another embodiment of the present disclosure is a migration recovery path. The destination server of the embodiment is the system shown in FIG. 1, and the destination server has the same environment with the source server. FIG. 16 is a flowchart of recovering the migration path. FIG. 17 is a schematic diagram of recovering the migration path in the environment of FIG. 1. More specifically, in this embodiment, the to-be-migrated information is migrated to the destination server after the migration save path is completed in the embodiments of FIG. 3 and FIG. 4.

In a step 1601, Libvirt 1701 sends a request to QEMU 1702 to import the to-be-migrated information. From off-chip, the QEMU 1702 receives a to-be-migrated instruction sent from the embodiments of FIG. 3 and FIG. 4, and initializes the live migration start request. Outside the chip refers to the source server, which may be on the same or different hardware platforms with the destination server.

In a step 1602, VMLU QOM 1704 sends the to-be-migrated information to a physical function drive program 1703. After receiving the to-be-migrated instruction, the VMLU QOM 1704, in response to the live migration start request, calls a write function to send the to-be-migrated information to the physical function drive program 1703.

In a step 1603, a physical function 1706 receives the to-be-migrated information. In the previous step, the VMLU QOM 1704 sends the to-be-migrated information to the physical function drive program 1703, and then the physical function drive program 1703 sends the to-be-migrated information to the physical function 1706.

In a step 1604, configuration, data and context of a specific virtual function 1707 and a specific virtual hardware 1708 are recovered.

First, the physical function 1706 idels the specific virtual function 1707, and makes the specific virtual function 1707 suspend communication with the user space 102, but other virtual functions may run as usual. After idling the specific virtual function 1707, the physical function 1706 sends the to-be-migrated information to the specific virtual hardware 1708 through the specific virtual function 1707.

Similarly, the specific virtual hardware 1708 may be the virtual computation apparatus, the specific virtual storage apparatus, the virtual video encoding and decoding apparatus or the virtual JPEG encoding and decoding apparatus in FIG. 1. The to-be-migrated information includes drive program related to the specific virtual hardware 1708, firmware, hardware information, context information and state information. After the destination server replied, the specific virtual function 1707 and the specific virtual hardware 1708 have the same environment and data as the specific virtual function 407 and the specific virtual hardware 408.

In a step 1605, the physical function 1706 reports to the physical function drive function 1703 that the migration is done. After sending the instruction, the physical function 1706 may send an end signal to the physical function drive program 603 of the kernel space 104.

In a step 1606, the physical function drive program 1703 notifies the VMLU QOM 1704 that the live migration is done; in other words, the physical function drive program 1703 sends the end signal to the QEMU 1702.

In a step 1607, the VMLU QOM 1704 changes the state to notify the virtual function drive program 1705 that the live migration is done. In response to the end signal, the VMLU QOM 1704 notifies the virtual function drive program 1705 that the live migration is done, and changes a state of a base address register simultaneously to make the base address register point to the specific virtual function 1707 and the specific virtual hardware 1708.

In a step 1608, the virtual function drive program 1705 sends a control signal to an interface 1709 of the virtual function drive program to continue an execution of tasks of the guest operating system.

In a step 1609, the interface 1709 of the virtual function drive program notifies the virtual function drive program 1705 to continue the execution of tasks of the guest operating system. The virtual function drive program 1705 receives tasks from the processor of the user space 102 again through the interface 1709 of the virtual function drive program, and these tasks may not access the specific virtual hardware 408 of the source server, but change to access the specific virtual hardware 1708 of the destination server.

In a step 1610, the VMLU QOM 1704 notifies the Libvirt 1701 that the live migration is done, and then the Libvirt 1701 clears distributed hardware resources on the source server. At this point, the migration recovery path is finished.

Combined with embodiments of the above mentioned migration save path and migration recovery path, the present disclosure may realize the live migration of the virtualized application specific integrated circuit (ASIC)

More specifically, a system in FIG. 17 further includes a deserializer 1710 configured to respond to the live migration start request. In a step 1604, data of a drive program of the specific virtual function 1707, firmware, information of the specific virtual hardware 1708, context information and state information is recovered according to the to-be-migrated information. The deserializer 1710 of the embodiment may be realized through hardware or firmware. If the deserializer is realized through the hardware, the deserializer 1710 is configured in the on-chip system 106; and if the deserializer is realized through the firmware, the deserializer 1710 is stored in an ROM of the on-chip system 106.

Figure 18:
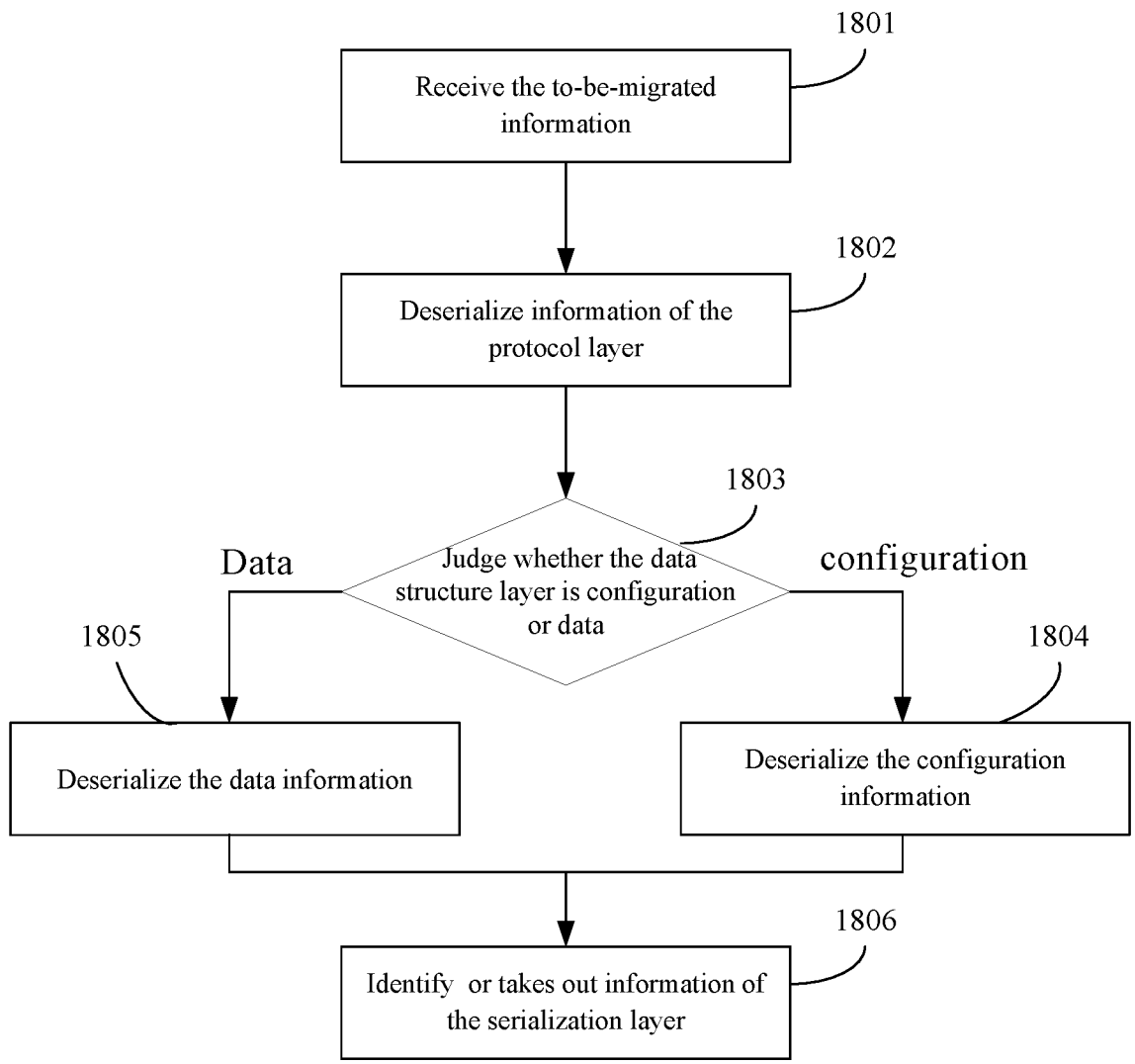
FIG. 18 is a flowchart of recovering path when implementing live migration on a deserializer according to an embodiment of the present disclosure.
Figure 19:
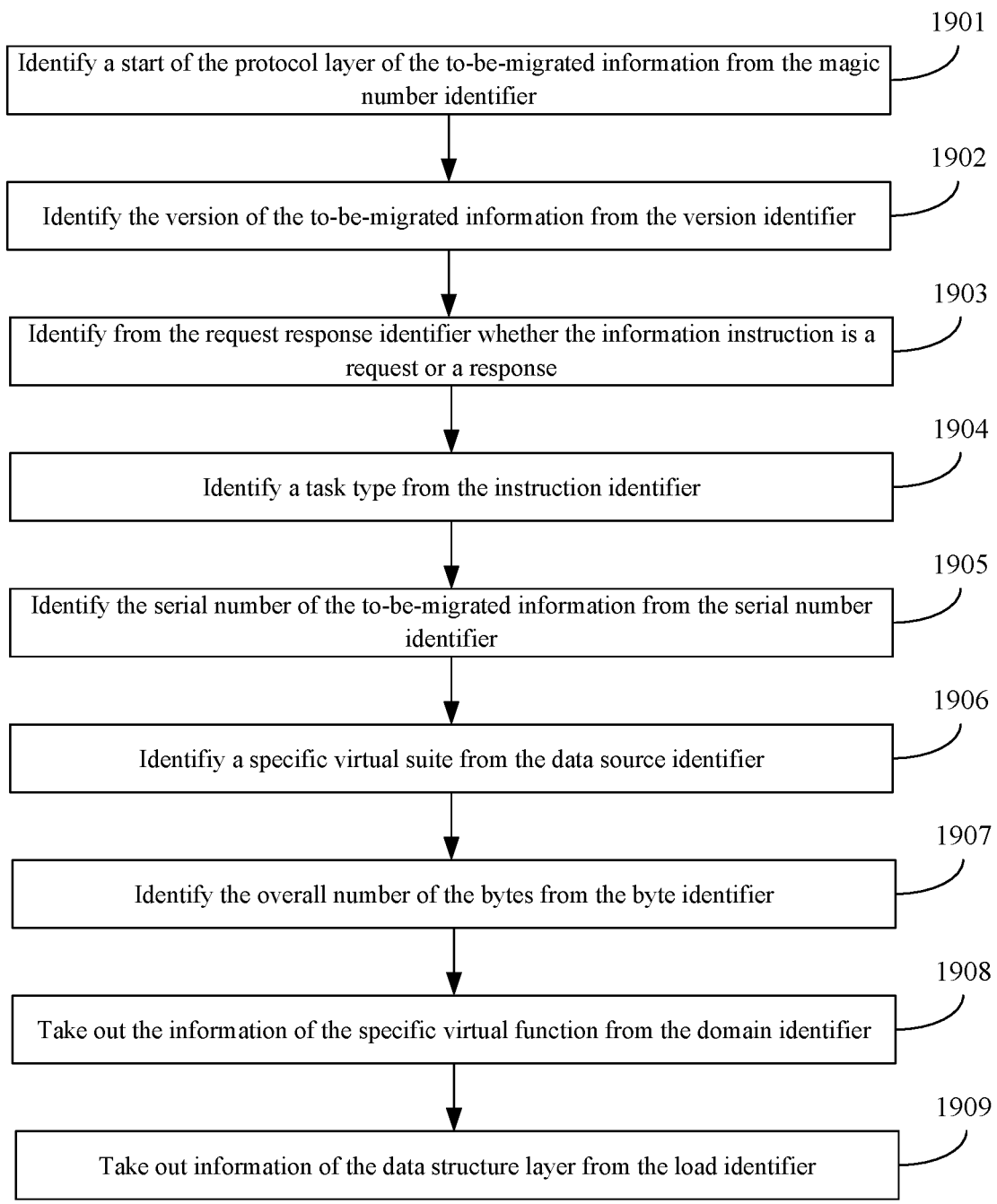
FIG. 19 is a flowchart of deserializing a protocol layer by a deserializer according to an embodiment of the present disclosure.

FIG. 18 is a flowchart of recovering path when implementing live migration on the deserializer 1710. In a step 1801, the deserializer 1710 receives the to-be-migrated information. In a step 1802, the deserializer 1710 deserializes information of the protocol layer 51, and this step is refined into a flowchart in FIG. 19.

Figure 5:
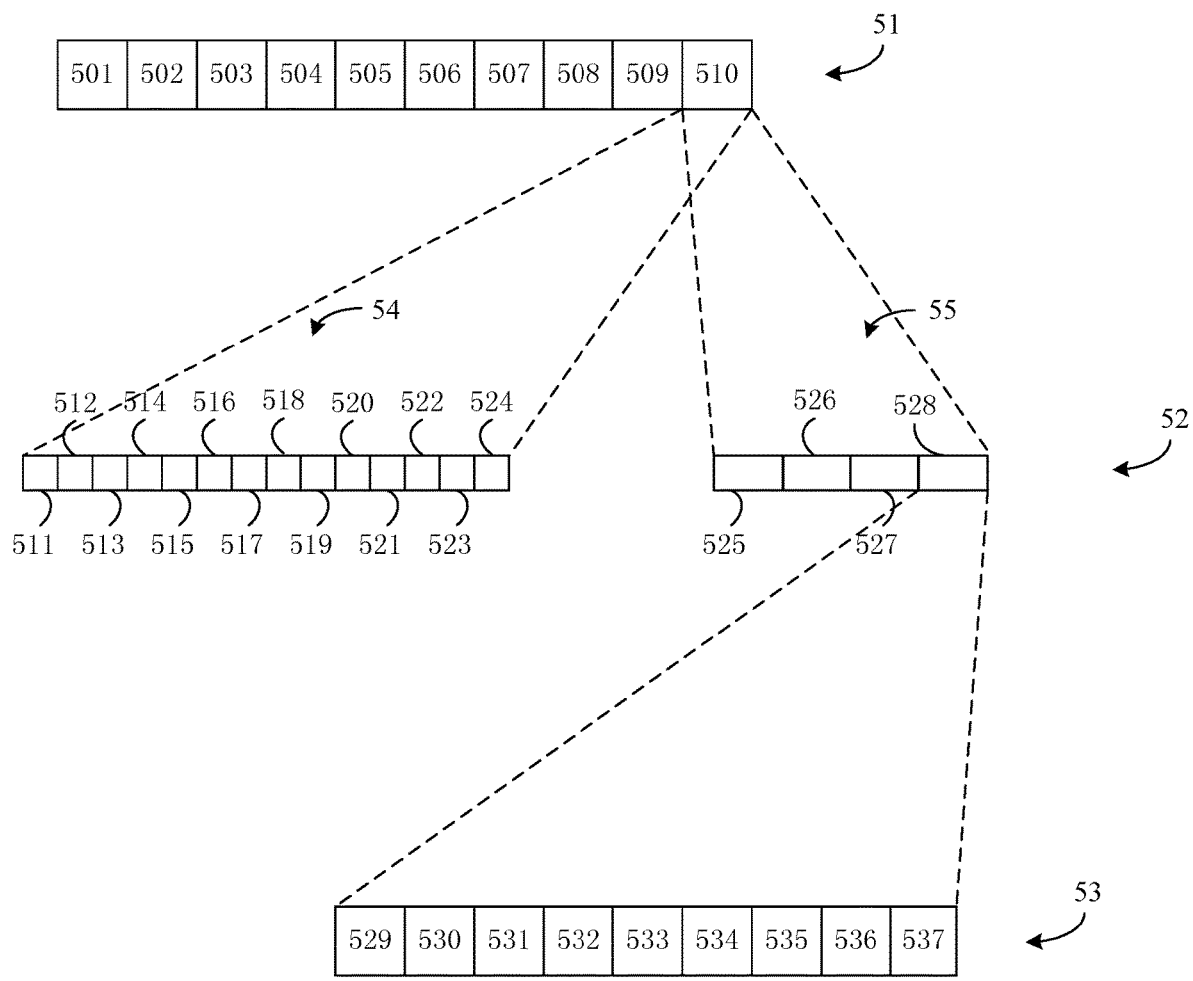
FIG. 5 is a schematic diagram of a data structure of to-be-migrated information.

In a step 1901, since the source server and the destination server follow the same protocol, the deserializer 1710 may identify the data structure in FIG. 5. The deserializer 1710 identifies from the magic number identifier 510 that the data structure is a start of the protocol layer 51 of the to-be-migrated information. In a step 1902, the deserializer identifies the version of the to-be-migrated information from the version identifier 502 to make sure that a system version of the destination server is higher or equal to a system version of the source server. In a step 1903, the deserializer identifies from the request response identifier 503 whether the information instruction is a request or a response. If this information instruction is the request, the migration recovery path may be continued; and if this information instruction is the response, the information is not the to-be-migrated information and may be stopped in recovery.

In a step 1904, the deserializer identifies from the instruction identifier 504 whether a task type of the to-be-migrated information is state migration and data migration or data dictionary updating. In a step 1905, the deserializer identifies the serial number of the to-be-migrated information from the serial number identifier 505 to judge a ranking of the to-be-migrated information in the whole live migration recovery path.

In a step 1906, the deserializer identifies a specific virtual suite from the data source identifier 506, where the specific virtual suite includes at least one of a virtual computation apparatus, a virtual video encoding and decoding apparatus, a virtual JPEG encoding and decoding apparatus and a virtual storage apparatus. The deserializer 1710 recovers the to-be-migrated information to the specified specific virtual suite according to information of the data source identifier 506.

In a step 1907, the deserializer identifies the overall number of the bytes of the to-be-migrated information or an overall number of the bytes of the play load from the byte identifier 507. In a step 1908, the deserializer takes out the information of the specific virtual function from the domain identifier 508, and recovers the to-be-migrated information to the specific virtual function 1707. In a step 1909, the deserializer takes out information of the data structure layer 52 from the load identifier 510.

In a step 1803, the deserializer 1710 starts to deserialize the information of the data structure layer 52. First, the deserializer judges whether the data structure layer 52 records configuration information or data information.

Figure 20:
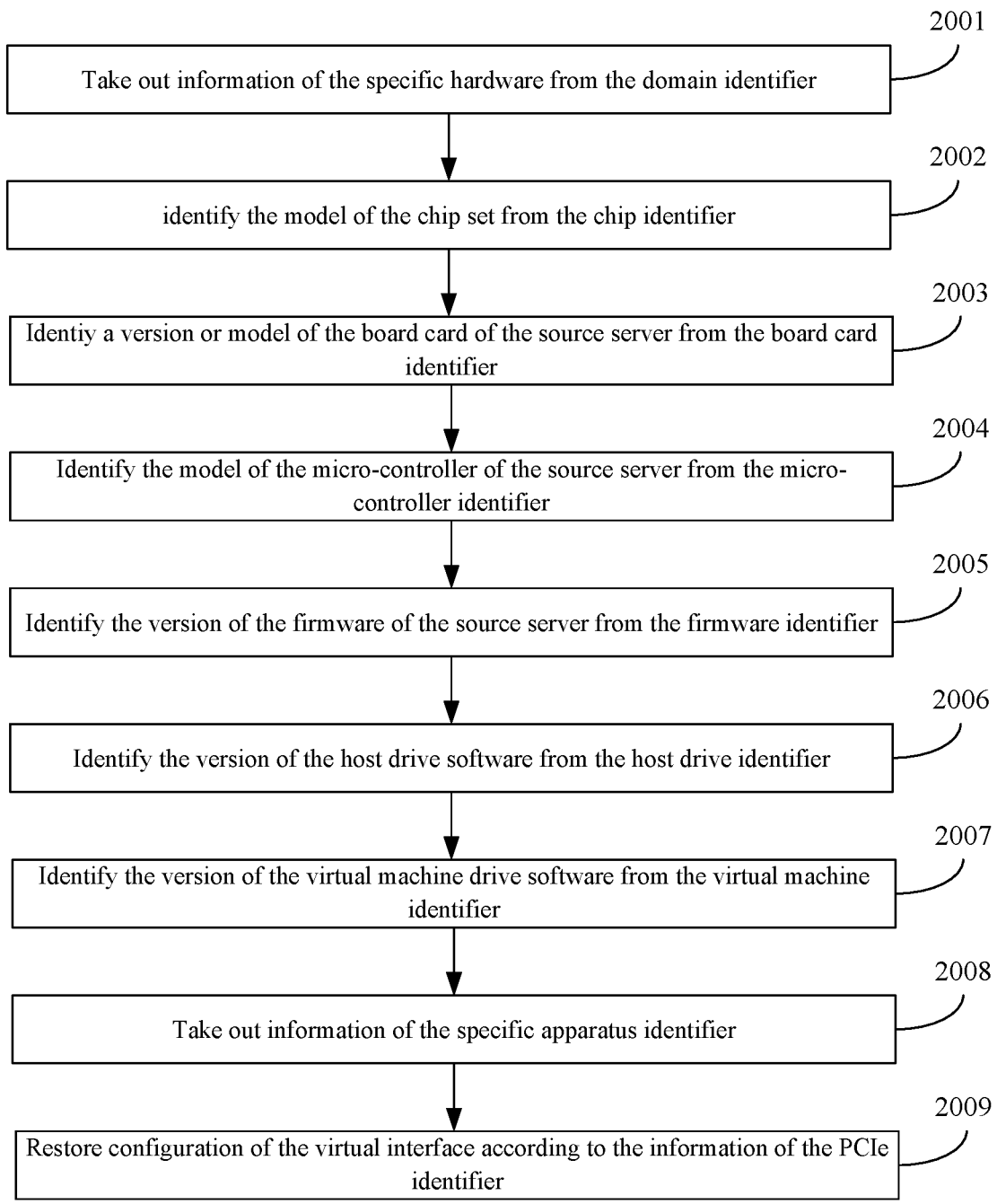
FIG. 20 is a flowchart of deserializing configuration information according to an embodiment of the present disclosure.

If the data structure layer 52 records the configuration information, a step 1804 is performed, in this step, the configuration information is deserialized, and this step is refined in the flowchart of FIG. 20. In a step 2001, the deserializer 1710 takes out information of the specific hardware from the domain identifier 511, and prepares to recover the to-be-migrated information to the specific hardware 1708. In a step 2002, the deserializer identifies the model of the chip set from the chip identifier 512 to judge whether the model of the chip set is compatible with a chipset of the destination server. In a step 2003, the deserializer identifies a version or model of the board card of the source server from the board card identifier 513 to judge whether the board card is compatible with a board card of the destination server. In a step 2004, the deserializer identifies the model of the micro-controller of the source server from the micro-controller identifier 514 to judge whether the micro-controller is compatible with a micro-controller of the destination server.

In a step 2005, the deserializer identifies the version of the firmware of the source server from the firmware identifier 515 to judge whether the firmware is compatible with firmware of the destination server. In a step 2006, the deserializer identifies the version of the host drive software of the source server from the host drive identifier 516 to judge whether the host drive software is compatible with a host drive software of the destination server. In a step 2007, the deserializer identifies the version of the virtual machine drive software of the source server from the virtual machine identifier 517 to judge whether the virtual machine drive software is compatible with a virtual machine drive software of the destination server.

In a step 2008, the deserializer takes out information of the specific apparatus identifier; in other words, the deserializer takes out the information from the computation apparatus identifier 519, the storage apparatus identifier 520, the video encoding and decoding apparatus identifier 521 and the JPEG encoding and decoding apparatus identifier 522 to restore the configuration of the specific apparatus. The specific apparatus is the specific hardware 1708, which is one of the virtual computation apparatus, the virtual video encoding and decoding apparatus, the virtual JPEG encoding and decoding apparatus, and the virtual storage apparatus.

In a step 2009, the deserializer restores configuration of the virtual interface according to the information of the PCIe identifier 523.

Figure 21:
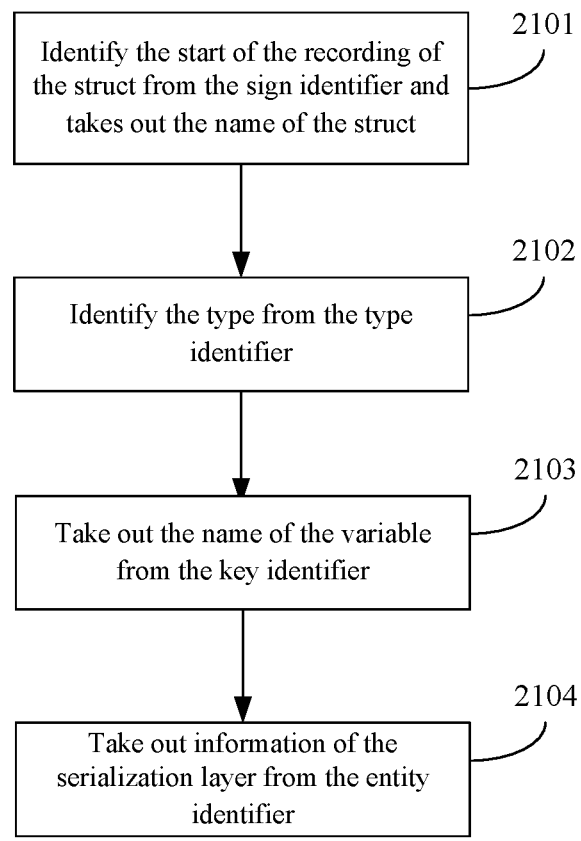
FIG. 21 is a flowchart of deserializing data information according to an embodiment of the present disclosure.

If the data structure layer 52 is configured to record the data information, a step 1805 is performed, in this step, the data information is deserialized, and this step is refined in the flowchart of FIG. 21. In a step 2101, the deserializer 1710 identifies the start of the recording of the struct from the sign identifier 525 and takes out the name of the struct. More specifically, since the signal identifier 525 includes a prefix signal, the deserializer 1710 identifies the prefix signal first, and then the name of the struct and a plurality of following identifiers may be identified according to the prefix signal. In a step 2102, the deserializer identifies the type from the type identifier 526. In a step 2103, the deserializer takes out the name of the variable from the key identifier 527; similarly, since the key identifier 527 includes the prefix signal, the deserializer may identify the prefix signal first, and then take out the name of the variable according to the prefix signal. In a step 2104, the deserializer takes out information of the serialization layer 53 from the entity identifier 528.

Figure 22:
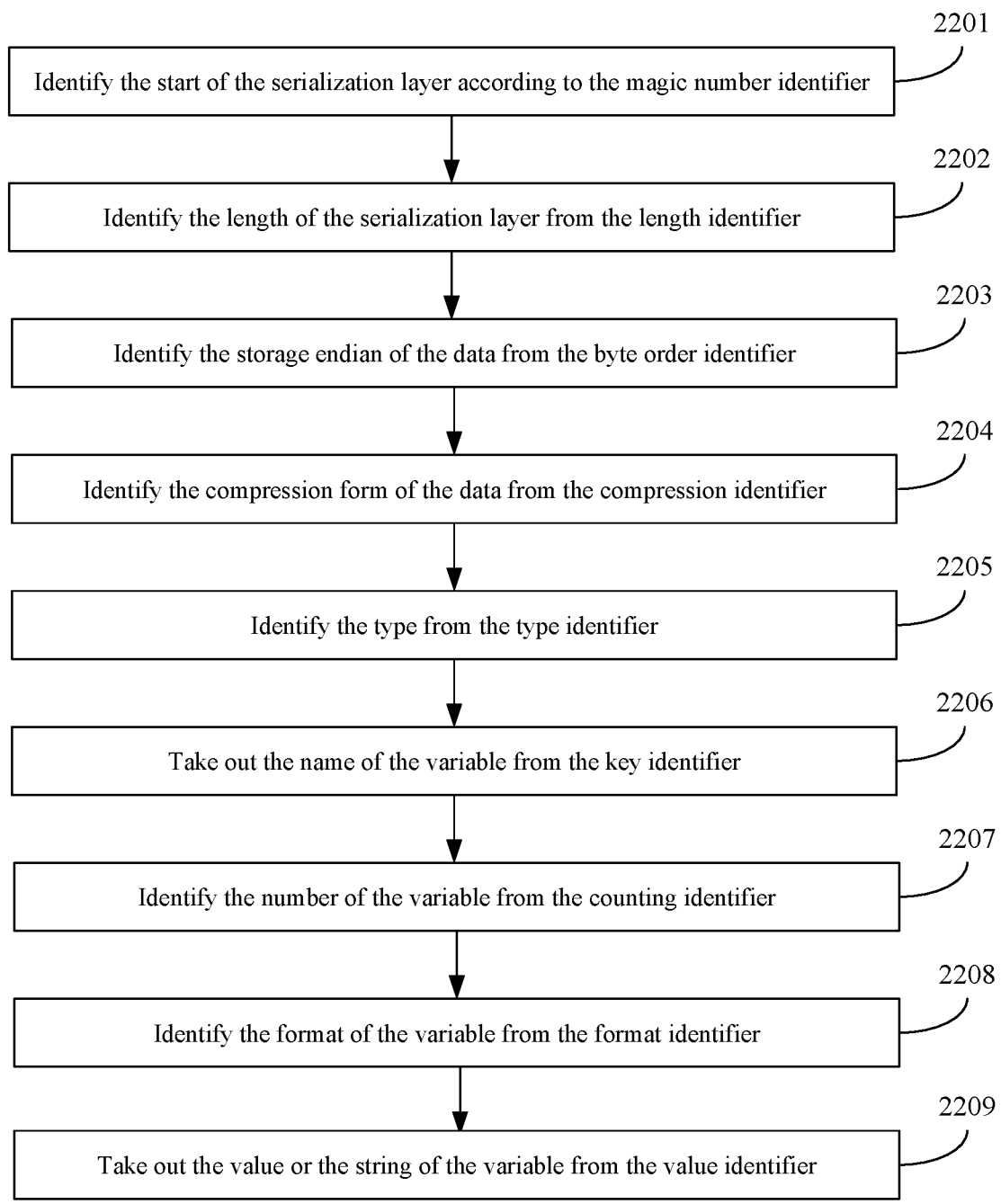
FIG. 22 is a flowchart of identifying or taking out information of a serialization layer according to an embodiment of the present disclosure.

Back to FIG. 18, the step 1806 may be continued, in this step, the deserializer identifies or takes out information of the serialization layer 53, and this step is refined into a flowchart in FIG. 22. In a step 2201, the deserializer 1710 continues to identify the start of the serialization layer 53 according to the magic number identifier 529. In a step 2202, the deserializer 1710 identifies the length of the serialization layer 53 from the length identifier 530. In a step 2203, the deserializer 1710 identifies from the byte order identifier 531 whether the storage endian of the data is the big-endian mode or the little-endian mode. In a step 2204, the deserializer 1710 identifies the compression form of the data from the compression identifier 532. In a step 2205, the deserializer identifies the type from the type identifier 533. In a step 2206, the deserializer 1710 takes out the name of the variable from the key identifier 534. In a step 2207, the deserializer 1710 identifies the number of the variable from the counting identifier 535. In a step 2208, the deserializer 1710 identifies the format of the variable from the format identifier 536. In a step 2209, the deserializer 1710 takes out the value or the string of the variable from the value identifier 537.

When meeting relative complicated data such as the tree data, the nested data or the logical pointer in deserialization, the deserializer 1710 may perform the following deserialization processes respectively.

Figure 23:
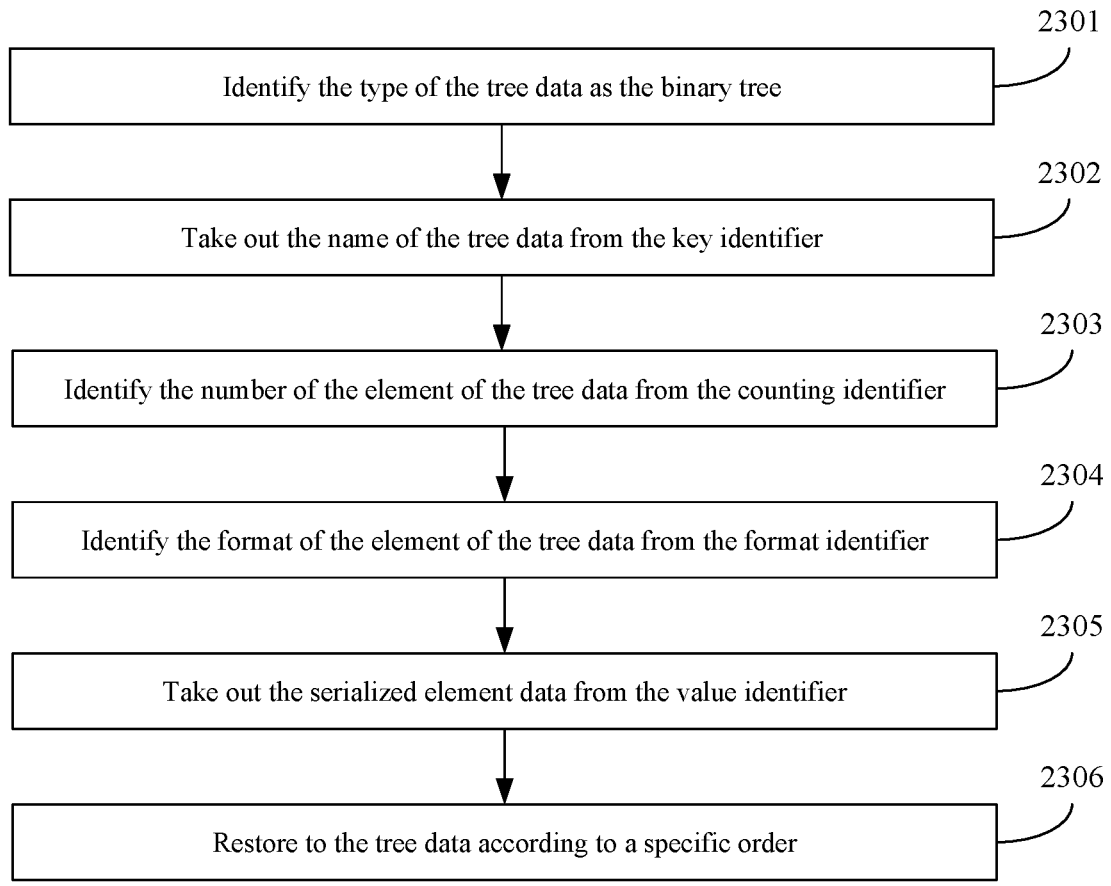
FIG. 23 is a flowchart of deserializing tree data according to an embodiment of the present disclosure.

When deserializing the tree data, the deserializer 1710 may perform the flowchart in FIG. 23. In a step 2301, the deserializer 1710 identifies that the type of the tree data is the binary tree. In a step 2302, the deserializer 1710 takes out the name of the tree data from the key identifier 534. In a step 2303, the deserializer 1710 identifies the number of the element of the tree data from the counting identifier 535. In a step 2304, the deserializer 1710 identifies the format of the element of the tree data from the format identifier 536. In a step 2305, the deserializer 1710 takes out the serialized element data from the value identifier 537. In a step 2306, according to the protocol, the deserializer 1710 restores the serialized element data to the tree data according to a specific order.

When deserializing the nested data, the deserializer 1710 is configured to receive the to-be-migrated information, whose data structure layer 52 includes the first signal identifier, and the serialization layer 53 includes the second signal identifier. The deserializer 1710 takes out first serialized data according to the first signal identifier, and takes out second serialized data according to the second signal identifier. The desesializer 1710 restores the first serialized data to the first layer struct, and restores the second serialized data to the second layer struct. At last, the deserializer 1710 stores the first struct and the second struct to the memory.

Figure 24:
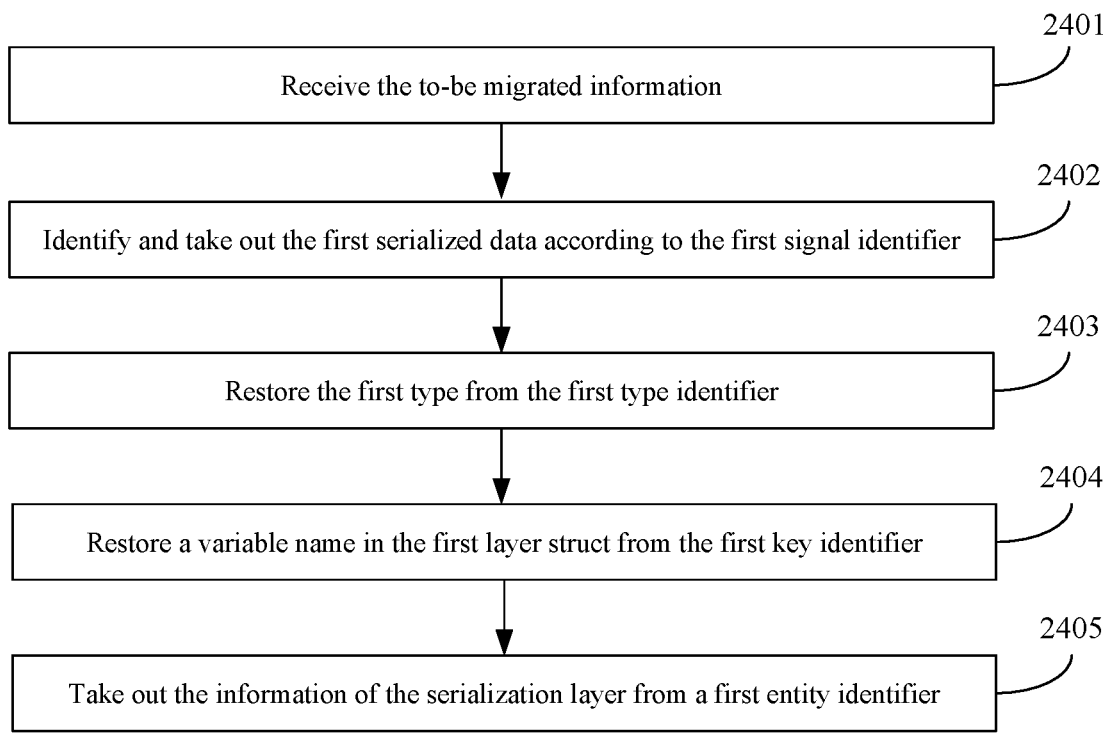
FIG. 24 is a flowchart of deserializing nested data according to an embodiment of the present disclosure.
Figure 25:
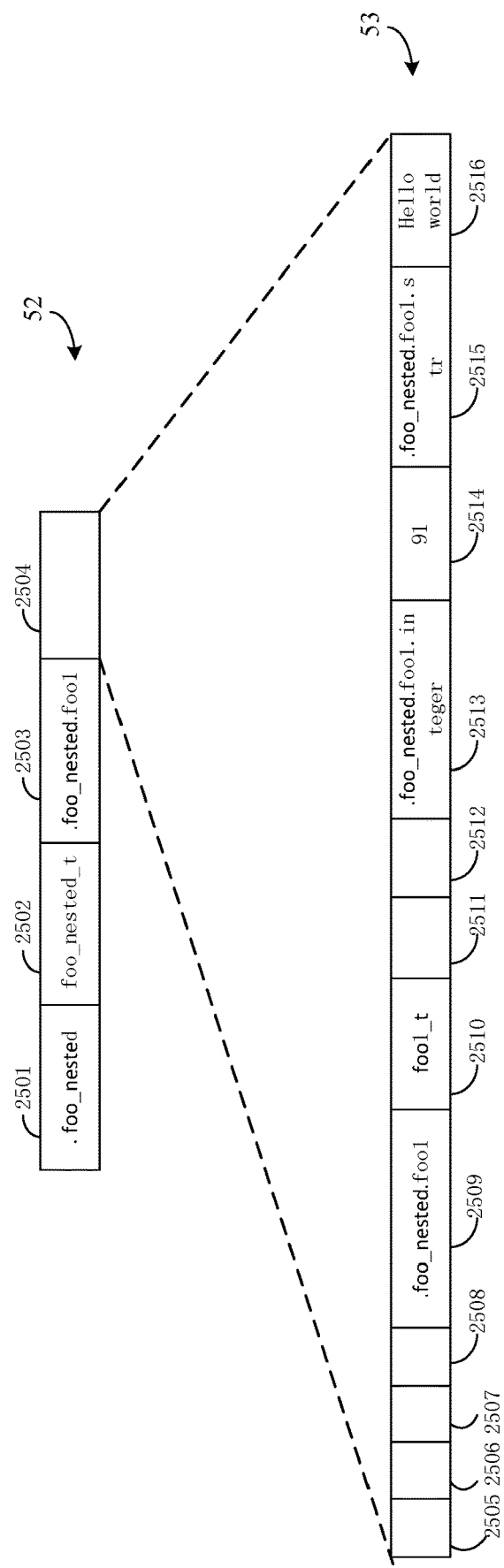
FIG. 25 is a schematic diagram of nested data according to an embodiment of the present disclosure.
Figure 26:
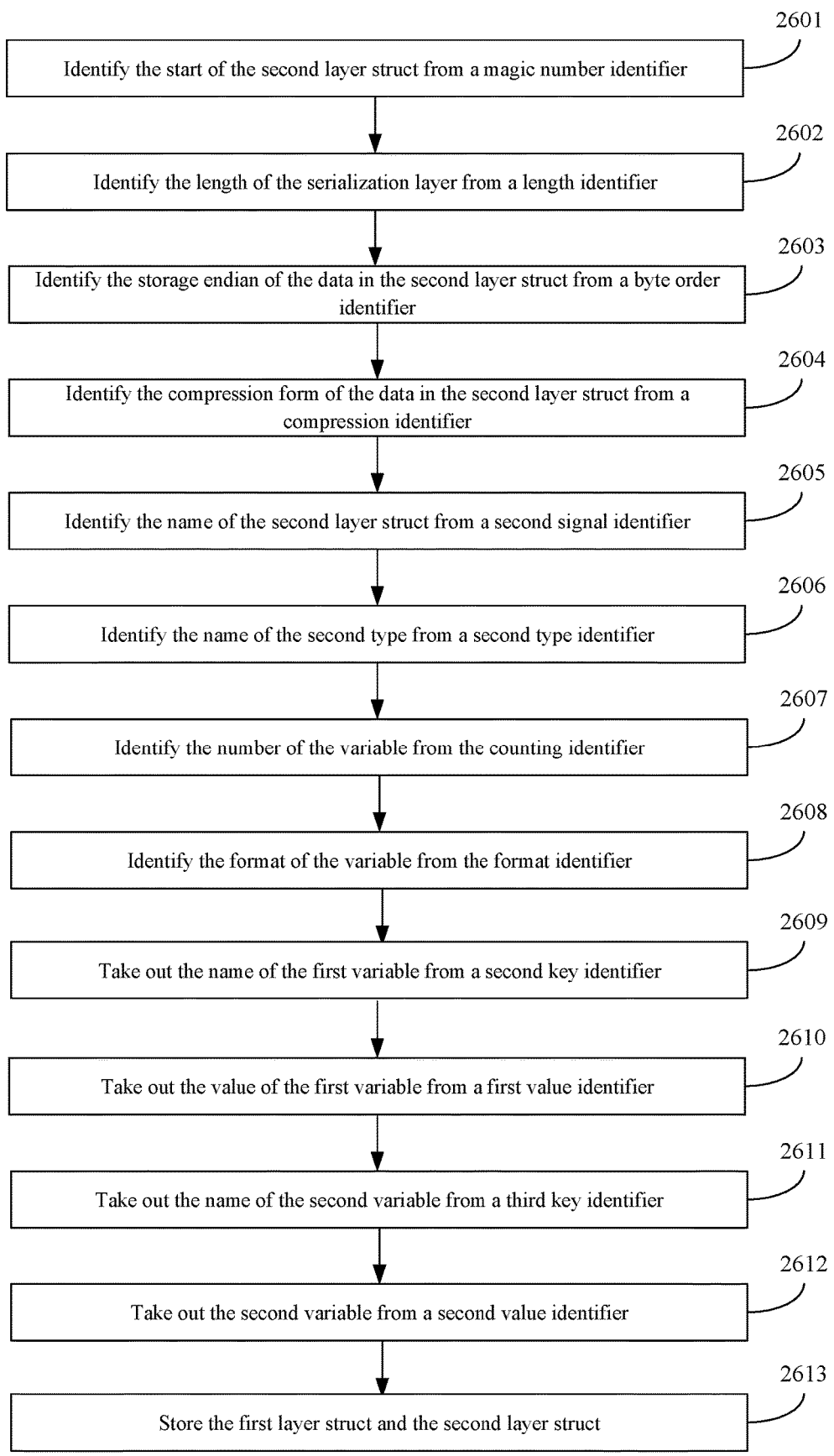
FIG. 26 is a flowchart of identifying or taking out information of a second layer struct according to an embodiment of the present disclosure.

More specifically, the deserializer 1710 performs the flowchart shown in FIG. 24 on the first layer struct. The following may take the nested data in FIG. 25 as an example. In a step 2401, the deserializer 1710 receives the to-be migrated information, whose data structure includes the data structure layer 52 and the serialization layer 53. The data structure layer 52 includes a first signal identifier 2501, and the serialization layer 53 includes a second signal identifier 2509. In a step 2402, according to the first signal identifier 2501, the deserializer 1710 identifies and takes out the first serialized data, whose struct name is "foo_nested". In a step 2403, the deserializer 1710 restores the first type from the first type identifier 2502, and the name of the first type is "foo_nested_t". In a step 2404, the deserializer 1710 restores a variable name in the first layer struct from the first key identifier 2503, and the name of the variable is "foo1". In a step 2405, the deserializer 1710 takes out the information of the serialization layer 53 from a first entity identifier 2504; in other words, the deserializer 1710 identifies or takes out the information of the second layer struct, this step may be further refined to the flowchart shown in FIG. 26.

In a step 2601, the deserializer 1710 identifies the start of the second layer struct from a magic number identifier 2505. In a step 2602, the deserializer 1710 identifies the length of the serialization layer 53 from a length identifier 2506. In a step 2603, the deserializer 1710 identifies the storage endian of the data in the second layer struct from a byte order identifier 2507. In a step 2604, the deserializer 1710 identifies the compression form of the data in the second layer struct from a compression identifier 2508. In a step 2605, the deserializer 1710 identifies the name of the second layer struct as "foo_nested_foo1" from a second signal identifier 2509. In a step 2606, the deserializer 1710 identifies the name of the second type as "foo t" from a second type identifier 2510. In a step 2607, the deserializer 1710 identifies the number of the variable from the counting identifier 2511. In a step 2608, the deserializer 1710 identifies the format of the variable from the format identifier 2512. In a step 2609, the deserializer 1710 takes out the name of the first variable as "integer" from a second key identifier 2513. In a step 2610, the deserializer 1710 takes out the value "91" of the first variable from a first value identifier 2514. In a step 2611, the deserializer 1710 takes out the name "str" of the second variable from a third key identifier 2515. In a step 2612, the deserializer 1710 takes out the string "Hello word" of the second variable from a second value identifier 2516. In a step 2613, the deserializer 1710 stores the first layer struct and the second layer struct, which means recovering all the information under the first layer struct and the second layer struct.

Figure 27:
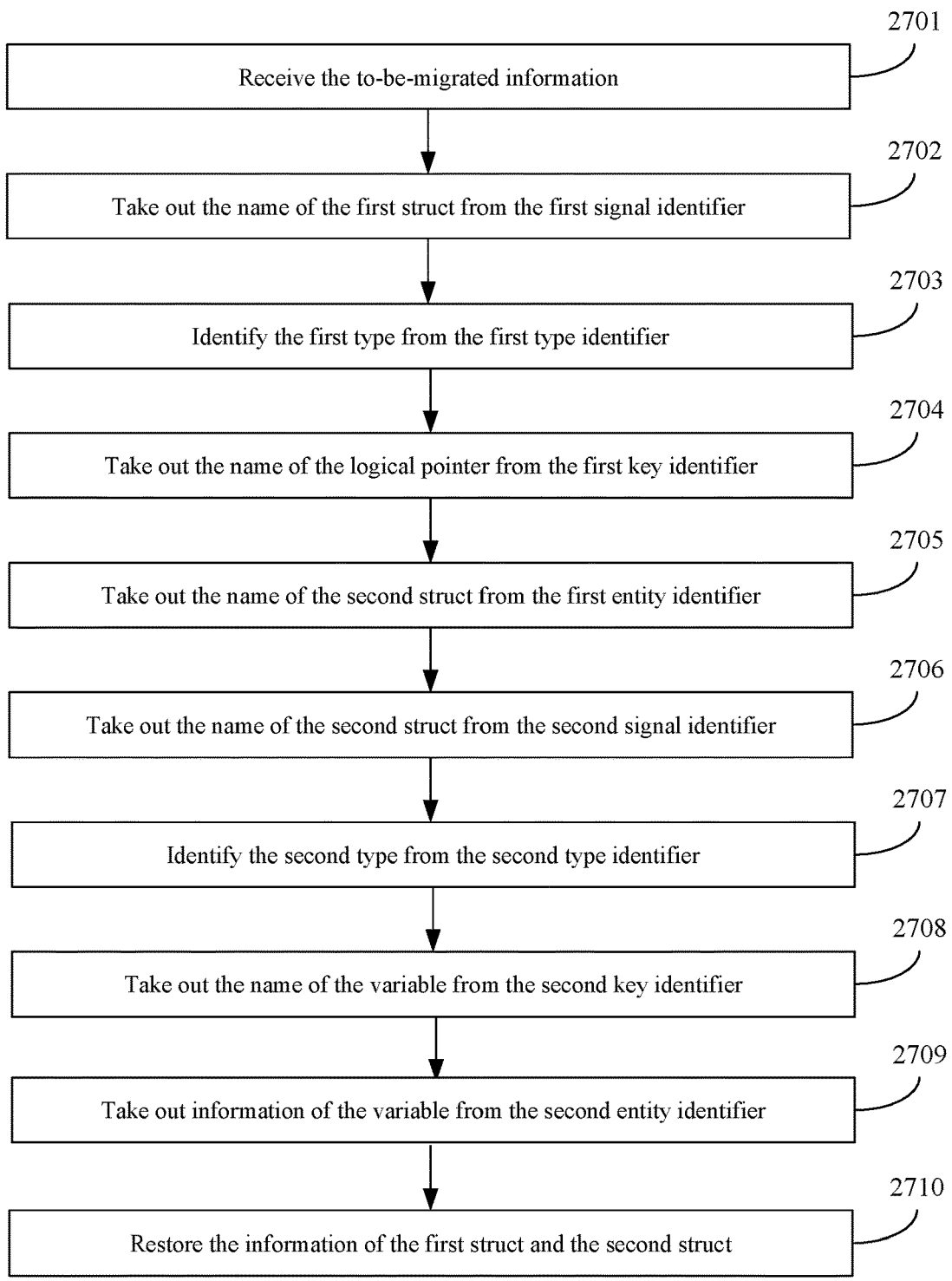
FIG. 27 is a flowchart of deserializing a logical pointer according to an embodiment of the present disclosure.

When deserializing the logical pointer, the deserializer 1710 may perform the flowchart in FIG. 27, and may simultaneously refer to the to-be-migrated information in FIG. 10 that includes the logical pointer. In a step 2701, the deserializer 1710 receives the to-be-migrated information. In a step 2702, the deserializer 1710 takes out the name of the first struct from the first signal identifier 1001. In a step 2703, the deserializer 1710 identifies the first type from the first type identifier 1002. In a step 2704, the deserializer 1710 takes out the name of the logical pointer from the first key identifier 1003. In a step 2705, the deserializer 1710 takes out the name of the second struct from the first entity identifier 1004. In a step 2706, the deserializer 1710 takes out the name of the second struct from the second signal identifier 1007. In a step 2707, the deserializer 1710 identifies the second type from the second type identifier 1008. In a step 2708, the deserializer 1710 takes out the name of the variable from the second key identifier 1009. In a step 2709, the deserializer 1710 takes out information of the variable from the second entity identifier 1010. In a step 2710, the deserializer 1710 restores the information of the first struct and the second struct.

The deserializer 1710 deserializes the to-be-migrated information, and restores drive programs of the specific virtual function 407 and the specific hardware 408, firmware, hardware information, context information and state information of the source server to the memories of the specific virtual function 1707 and the specific hardware 1708 in the destination server through the physical function 1706.

Figure 28:
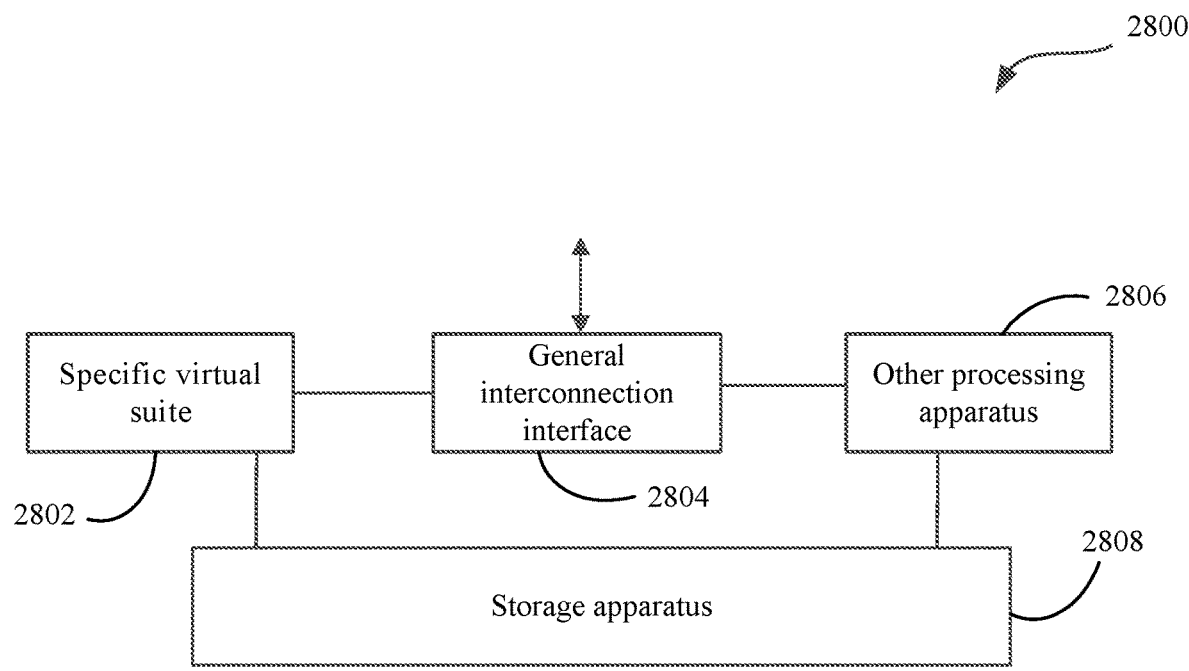
FIG. 28 is a structural diagram of an integrated circuit apparatus according to an embodiment of the present disclosure.

FIG. 28 is a structural diagram of an integrated circuit apparatus 2800 according to an embodiment of the present disclosure. As shown in FIG. 28, the integrated circuit apparatus 2800 is the on-chip system 106 of the above mentioned plurality of embodiments. The integrated circuit apparatus includes a specific virtual suite 2802, which is at least one of a virtual computation apparatus, a virtual video encoding and decoding apparatus, and a virtual JPEG encoding and decoding apparatus. In addition, the integrated circuit apparatus 2800 also includes a general interconnection interface 2804 and other processing apparatus 2806.

Other processing apparatus 2806 may be one or more kinds of general-purpose/special-purpose processors such as a central processing unit, a graphics processing unit, an artificial intelligence processor, and the like, and the number of processors is not restrictive but is determined according to actual demands. Other processing apparatus 2806 serves as an interface that connects the specific virtual suite 2802 and external data and control, and may perform basic controls such as moving data, starting and stopping the specific virtual suite 2802, and the like. Other processing apparatus 2806 may cooperate with the specific virtual suite 2802 to finish the computation task.

The general interconnection interface 2804 may also be configured to transmit data and control instructions between the specific virtual suite 2802 and other processing apparatus 2806. For example, the specific virtual suite 2802 may obtain required input data from other processing apparatus 2806 through the general interconnection interface 2804, and write the required input data to a storage unit of the specific virtual suite 2802. Further, the specific virtual suite 2802 may obtain a control instruction from other processing apparatus 2806 through the general interconnection interface 2804, and write the control instruction to a control caching unit of the specific virtual suite 2802. Alternatively or optionally, the general interconnection interface 2804 may read data in the storage unit of the specific virtual suite 2802 and transmit the data to other processing apparatus 2806.

The integrated circuit apparatus 2800 also includes a storage apparatus 2808, which may be connected to the specific virtual suite 2802 and other processing apparatus 2806 respectively. The storage apparatus 2808 is the virtual storage apparatus 148, which is configured to store data of the specific virtual suite 2802 and data of other processing apparatus 2806. The storage apparatus 2808 is particularly suitable when to-be-computed data may not be entirely stored in the specific virtual suite 2802 or other computation apparatus 2806.

According to different application scenarios, the integrated circuit apparatus 2800 may be used as an SOC (system on chip) of a mobile phone, a robot, a drone, a video capture device, and the like, thereby effectively reducing a core area of a control part, increasing processing speed, and reducing overall power consumption. In this case, the general interconnection interface 2804 of the integrated circuit apparatus 2800 is connected to some components of the device. The components may include a camera, a monitor, a mouse, a keyboard, a network card, or a WIFI interface.

The present disclosure also discloses a chip or an integrated circuit chip, which includes the integrated circuit apparatus 2800. The present disclosure also discloses a chip package structure, which includes the above-mentioned chip.

Figure 29:
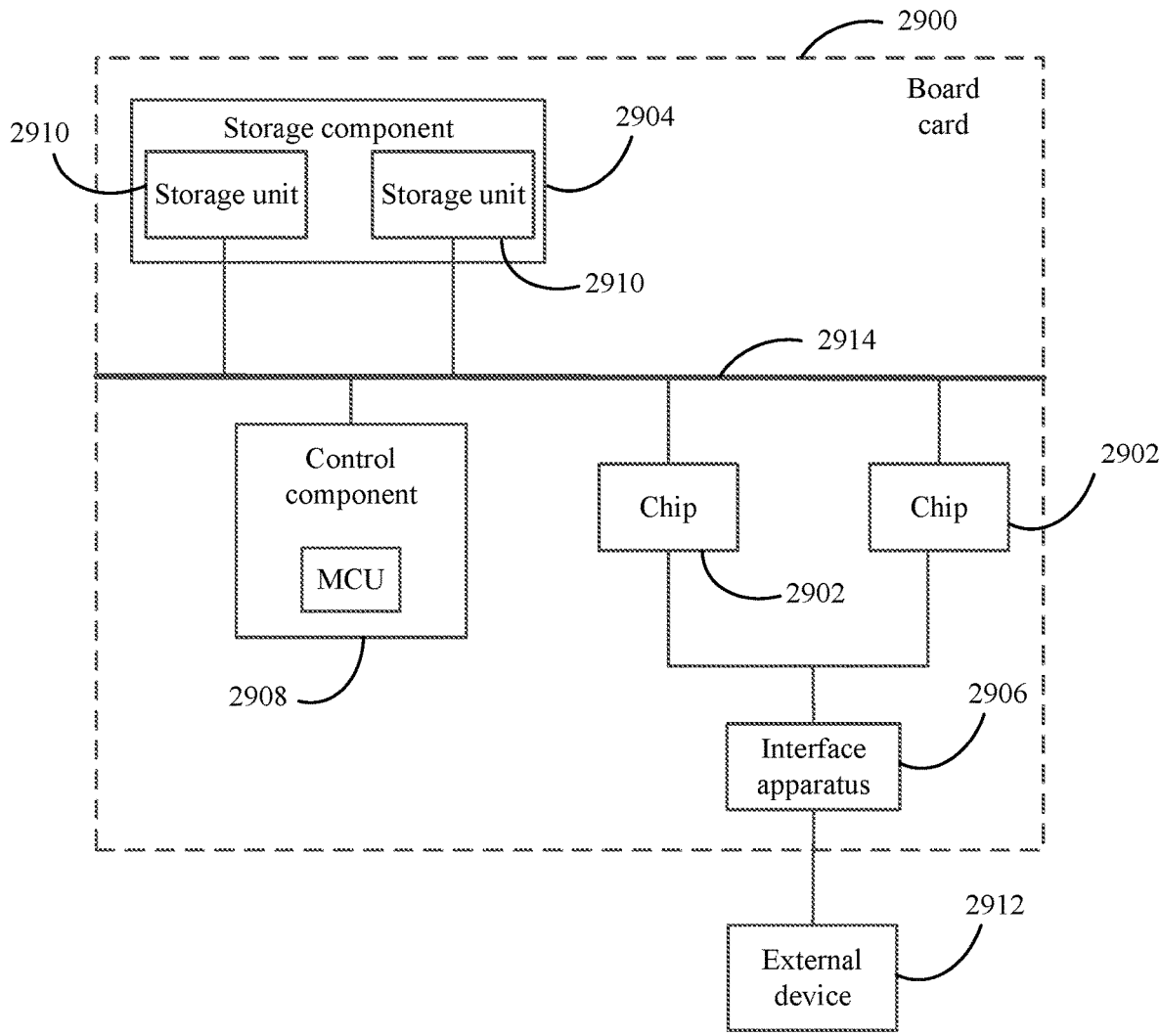
FIG. 29 is a schematic diagram of a board card according to an embodiment of the present disclosure.

In another embodiment, the present disclosure provides a board card, which includes the above chip package structure. Referring to FIG. 29, in addition to including a plurality of chips 2902, a board card 2900 further includes other matching components. The matching components include a storage component 2904, an interface apparatus 2906, and a control component 2908.

The storage component 2904 is connected to the chip 2902 in the chip package structure through a bus 2914, and the storage component 2904 is configured to store data. The storage component 2904 may include a plurality of groups of storage units 2910.

The interface apparatus 2906 is electrically connected to the chip 2902 in the chip package structure. The interface apparatus 2906 is configured to implement data transmission between the chip 2902 and an external device 2912 (such as a server or a computer). In this embodiment, the interface apparatus 2906 is a standard PCIe interface, and data to be processed is transmitted from the server to the chip 2902 through the standard PCIe interface to realize data transmission. The computation result of the chip 2902 is still transmitted by the interface apparatus 2906 back to the external device 2912.

The control component 2908 is electrically connected to the chip 2902 to monitor a state of the chip 2902. Specifically, the chip 2902 and the control component 2908 may be electrically connected through an SPI (serial peripheral interface). The control component 2908 may include an MCU (micro-controller unit).

Another embodiment of the present disclosure provides an electronic device or an apparatus, which includes the above mentioned board card 2900. According to different application scenarios, the electronic device or apparatus may include a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle includes an airplane, a ship, and/or a car; the household appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

Another embodiment of the present disclosure provides a computer-readable storage medium, on which serialized or deserialized computer program code is stored. The above mentioned method may be implemented when the computer program code is run by the processor.

The present disclosure may implement live migration of the specific virtual functions. The drive program of the virtual hardware, firmware, hardware information, context information and state information to the destination server. In the present disclosure, the serialization technology is adopted to generate the to-be-migrated information for convenient transfer, and the destination server deserializes the to-be-migrated information based on the same protocol to recover the configuration and data.

What is claimed:

1. A system for implementing live migration storage, wherein the system is connected to kernel space, and the system comprises:

an ROM (read-only memory) that stores firmware, wherein the firmware includes a physical function that is virtualized to a plurality of virtual functions, wherein the physical function receives a live migration start request from the kernel space, wherein the live migration start request specifies a live migration of a specific virtual function, wherein the specific virtual function is one of the plurality of virtual functions; and a serializer configured to respond to the live migration start request to generate a data structure of to-be-migrated information, wherein the data structure comprises a protocol layer, wherein the protocol layer comprises a domain identifier configured to record the specific virtual function, wherein the physical function sends the to-be-migrated information to the kernel space.

2. The system of claim 1, wherein the serializer generates a version identifier in the protocol layer to indicate a version of the to-be-migrated information.

3. The system of claim 1, further comprising: a suite virtualized to a plurality of virtual suites, wherein each virtual function corresponds to one virtual suite, and the suite comprises at least one of a computation apparatus, a video encoding and decoding apparatus, a JPEG encoding and decoding apparatus, and a storage apparatus, wherein the specific virtual function corresponds to a specific virtual suite.

4. The system of claim 3, wherein the to-be-migrated information comes from a specific apparatus, wherein the specific apparatus is as least one of the computation apparatus, the video encoding and decoding apparatus, the JPEG encoding and decoding apparatus, and the storage apparatus; and the serializer generates a data source identifier in the protocol layer to record the specific apparatus.

5. The system of claim 1, wherein the data structure further comprises a data structure layer, and the serializer generates a loading identifier in the protocol layer to record information of the data structure layer.

6. The system of claim 5, wherein the data structure layer is configured to record configuration information.

7. The system of claim 6, wherein the serializer generates a chip identifier in the data structure layer to record a model of a chip set of the system.

8. The system of claim 6, wherein the serializer generates a board card identifier in the data structure layer to record a version or a model of the system.

9. The system of claim 6, wherein the serializer generates a firmware identifier in the data structure layer to record a firmware version of the system.

10. The system of claim 6, wherein the to-be-migrated information comes from the specific apparatus, wherein the specific apparatus is as least one of the computation apparatus, the video encoding and decoding apparatus, the JPEG encoding and decoding apparatus, and the storage apparatus in the system; and the serializer generates a specific apparatus identifier in the data structure layer to record configuration of the specific apparatus.

11. The system of claim 5, wherein the data structure layer is configured to record data information.

12. The system of claim 11, wherein the data information comprises a struct, and the serializer generates a signal identifier in the data structure layer to record a start of the struct.

13. The system of claim 12, wherein the struct comprises at least one type, and the serializer generates a type identifier in the data structure layer to record the type.

14. The system of claim 13, wherein the type comprises at least one variable, and the serializer generates a key identifier in the data structure layer to record a name of the variable.

15. The system of claim 13, wherein the data structure further comprises a serialization layer, and the serializer generates an entity identifier in the data structure layer to record information of the serialization layer.

16. The system of claim 15, wherein the serializer generates a magic number identifier in the serialization layer to indicate a start of the serialization layer.

17. The system of claim 15, wherein the data information comprises the type, and the serializer generates a type identifier in the serialization layer to indicate the type.

18. The system of claim 17, wherein the type comprises at least one variable, and the serializer generates a key identifier in the serialization layer to record a name of the variable.

19. The system of claim 18, wherein the serializer generates a value identifier in the serialization layer to record a value or a string of the variable.

20. A method for saving path when implementing a live migration to a system, wherein the system is connected to kernel space and comprises an ROM that stores firmware, wherein the firmware comprises a physical function virtualized to a plurality of virtual functions, and the method comprises:

receiving a live migration start request, wherein the live migration start request specifies a live migration of a specific virtual function, wherein the specific virtual function is one of the plurality of virtual functions;

generating a data structure of to-be-migrated information, wherein the data structure comprises a domain identifier configured to record the specific virtual function; and sending the to-be-migrated information to the kernel space.

* * * * *